US012580338B2

(12) United States Patent
Hashiguchi et al.

(10) Patent No.: US 12,580,338 B2
(45) Date of Patent: Mar. 17, 2026

(54) CONNECTOR AND MANUFACTURING METHOD THEREOF

(71) Applicant: Japan Aviation Electronics Industry, Ltd., Tokyo (JP)

(72) Inventors: Osamu Hashiguchi, Tokyo (JP); Tetsuya Komoto, Tokyo (JP)

(73) Assignee: Japan Aviation Electronics Industry, Ltd., Tokyo (JP)

( * ) Notice: Subject to any disclaimer, the term of this patent is extended or adjusted under 35 U.S.C. 154(b) by 463 days.

(21) Appl. No.: 18/157,104

(22) Filed: Jan. 20, 2023

(65) Prior Publication Data

US 2023/0283006 A1 Sep. 7, 2023

(30) Foreign Application Priority Data

Mar. 7, 2022 (JP) ................................ 2022-034070

(51) Int. Cl.
*H01R 13/405* (2006.01)
*H01R 13/115* (2006.01)
*H01R 43/24* (2006.01)

(52) U.S. Cl.
CPC ......... *H01R 13/405* (2013.01); *H01R 13/115* (2013.01); *H01R 43/24* (2013.01)

(58) Field of Classification Search
CPC .... H01R 13/405; H01R 13/115; H01R 43/24; H01R 12/73; H01R 12/716; H01R 43/20; H01R 12/71; H01R 13/2428; H01R 13/2492
See application file for complete search history.

(56) References Cited

U.S. PATENT DOCUMENTS 4,911,653 A * 3/1990 Walton .................. H01R 12/62 439/493
5,507,651 A * 4/1996 Tanaka ................ H01R 12/716 439/632
6,089,920 A * 7/2000 Farnworth ......... H01R 12/7082 439/632
6,942,496 B2 * 9/2005 Sweetland ......... H01R 13/2492 439/67
2012/0094544 A1 * 4/2012 Sato ...................... H01R 13/11 439/660
2012/0315803 A1 * 12/2012 Kobayashi ........... H01R 12/714 29/874

(Continued)

FOREIGN PATENT DOCUMENTS

JP H08-31492 A 2/1996

*Primary Examiner* — Truc T Nguyen
(74) *Attorney, Agent, or Firm* — Renner, Otto, Boisselle & Sklar, LLP

(57) ABSTRACT

A method of manufacturing a receptacle includes an assembly manufacturing step, an accommodating step, and an insert molding step. The assembly manufacturing step manufactures each receptacle contact assembly in such a way that a base includes two supporting bases with a coupling base interposed therebetween in a pitch direction. The accommodating step accommodates a plurality of receptacle contact assemblies into an injection mold in such a way that each receptacle contact assembly is supported at both ends in the injection mold by using the two supporting bases. The insert molding step molds a receptacle housing integrally with the plurality of receptacle contact assemblies by insert molding.

15 Claims, 20 Drawing Sheets

(56) References Cited

U.S. PATENT DOCUMENTS

| | | | | |
|---|---|---|---|---|
| 2013/0137305 | A1* | 5/2013 | Komoto | H01R 13/46 439/626 |
| 2013/0295784 | A1* | 11/2013 | Hasegawa | H01R 12/73 439/55 |
| 2014/0004745 | A1* | 1/2014 | Komoto | H01R 12/71 439/626 |
| 2015/0162679 | A1* | 6/2015 | Komoto | H01R 12/714 439/670 |
| 2015/0214681 | A1* | 7/2015 | Nakamura | H01R 24/68 439/374 |
| 2015/0270641 | A1* | 9/2015 | Omodachi | H01R 12/7005 439/374 |
| 2016/0172803 | A1* | 6/2016 | Tamai | H01R 13/6473 439/676 |
| 2019/0052002 | A1* | 2/2019 | Hasegawa | H01R 12/716 |
| 2020/0366015 | A1* | 11/2020 | Beaman | H01R 12/771 |
| 2023/0125645 | A1* | 4/2023 | Yin | H01R 12/716 439/108 |
| 2023/0170649 | A1* | 6/2023 | Hsiao | H01R 12/725 439/92 |
| 2023/0246375 | A1* | 8/2023 | Takagi | H01R 13/502 439/74 |
| 2023/0261400 | A1* | 8/2023 | Tsunemura | H01R 13/46 439/74 |
| 2023/0283017 | A1* | 9/2023 | Komoto | H01R 13/24 439/660 |
| 2023/0299530 | A1* | 9/2023 | Hashiguchi | H01R 12/57 439/660 |

* cited by examiner

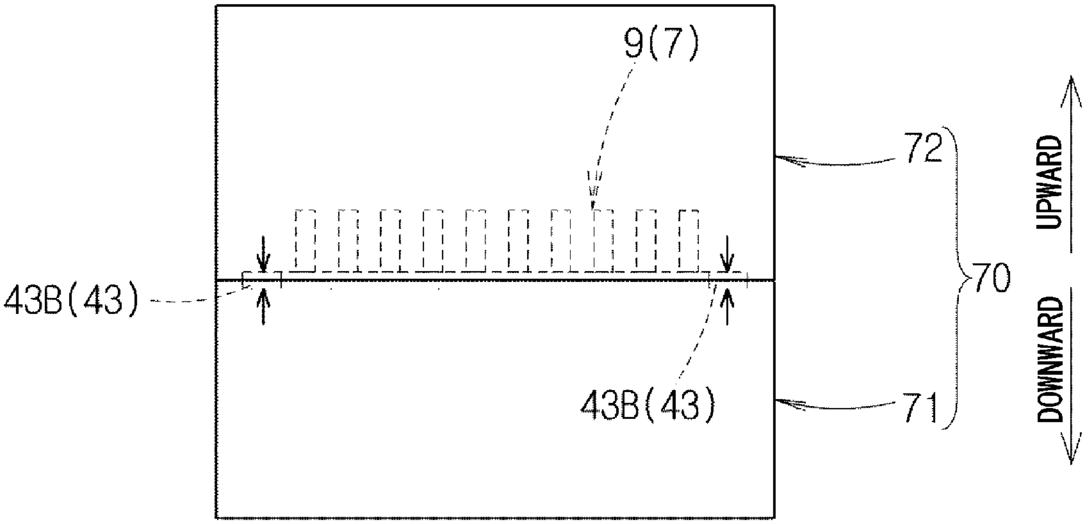
Fig. 17

CONNECTOR AND MANUFACTURING METHOD THEREOF

INCORPORATION BY REFERENCE

This application is based upon and claims the benefit of priority from Japanese patent application No. 2022-034070, filed on Mar. 7, 2022, the disclosure of which is incorporated herein in its entirety by reference.

BACKGROUND

The present invention relates to a connector and a manufacturing method of the same.

As shown in FIG. 20 of the present application, Patent Literature 1 (Japanese Unexamined Patent Application Publication No. H8-31492) discloses a method of manufacturing a connector 1002 including a molding step of forming a supporting bodies 1001 that support a plurality of terminal pins 1000 arranged in a line by insert molding, a joining step of joining two supporting bodies 1001 adjacent to each other, and an accommodating step of accommodating the plurality of joined supporting bodies 1001 into an accommodation case, which is not shown.

SUMMARY

The manufacturing method disclosed in Patent Literature 1 requires the accommodation case for accommodating the plurality of supporting bodies 1001, which causes an increase in the size of a connector.

One of the objects of the present disclosure is to provide a technique to achieve the size reduction of a connector.

According to a first aspect of the present disclosure, there is provided a manufacturing method of a connector, the connector including at least one contact assembly and a housing accommodating the at least one contact assembly, the at least one contact assembly and the housing being integrally formed by insert molding, and the at least one contact assembly including a base made of metal including a plurality of contact bases arranged in a longitudinal direction of the contact assembly and a coupling base coupling the plurality of contact bases with one another, and a plurality of conductive patterns formed in the plurality of contact bases with an insulating layer interposed therebetween, the method including an assembly manufacturing step of manufacturing the at least one contact assembly in such a way that the base includes two supporting bases with the coupling base interposed therebetween in the longitudinal direction; an accommodating step of accommodating the at least one contact assembly into an injection mold in such a way that the at least one contact assembly is supported at both ends in the injection mold by using the two supporting bases; and an insert molding step of molding the housing integrally with the at least one contact assembly by insert molding.

According to a second aspect of the present disclosure, there is provided a connector including at least one contact assembly; and a housing accommodating the at least one contact assembly, the at least one contact assembly and the housing being integrally formed by insert molding, wherein the at least one contact assembly includes a base made of metal including a plurality of contact bases arranged in a longitudinal direction of the contact assembly and a coupling base coupling the plurality of contact bases with one another, and a plurality of conductive patterns formed in the plurality of contact bases with an insulating layer interposed therebetween, and a sectional surface of the base of the at least one contact assembly is observable when viewing the connector along the longitudinal direction.

According to the present disclosure, the size reduction of a connector is achieved.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 17 is a front view of the injection mold in which a plurality of receptacle contact assemblies are accommodated;

DESCRIPTION OF EMBODIMENTS

An embodiment of the present disclosure will be described hereinafter with reference to FIGS. 1 to 19.

Figure 1:
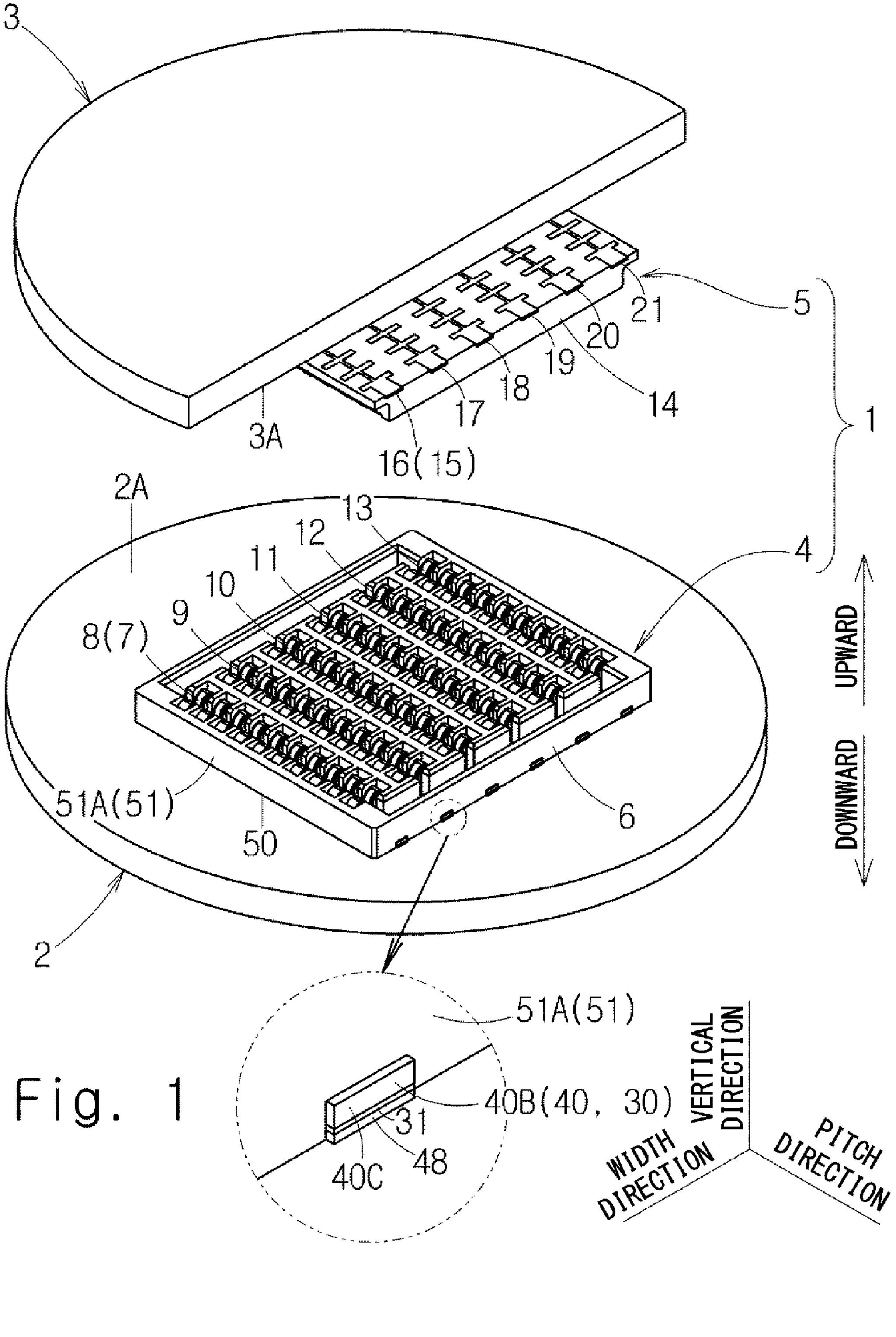
FIG. 1 is a perspective view of a connector assembly.
Figure 2:
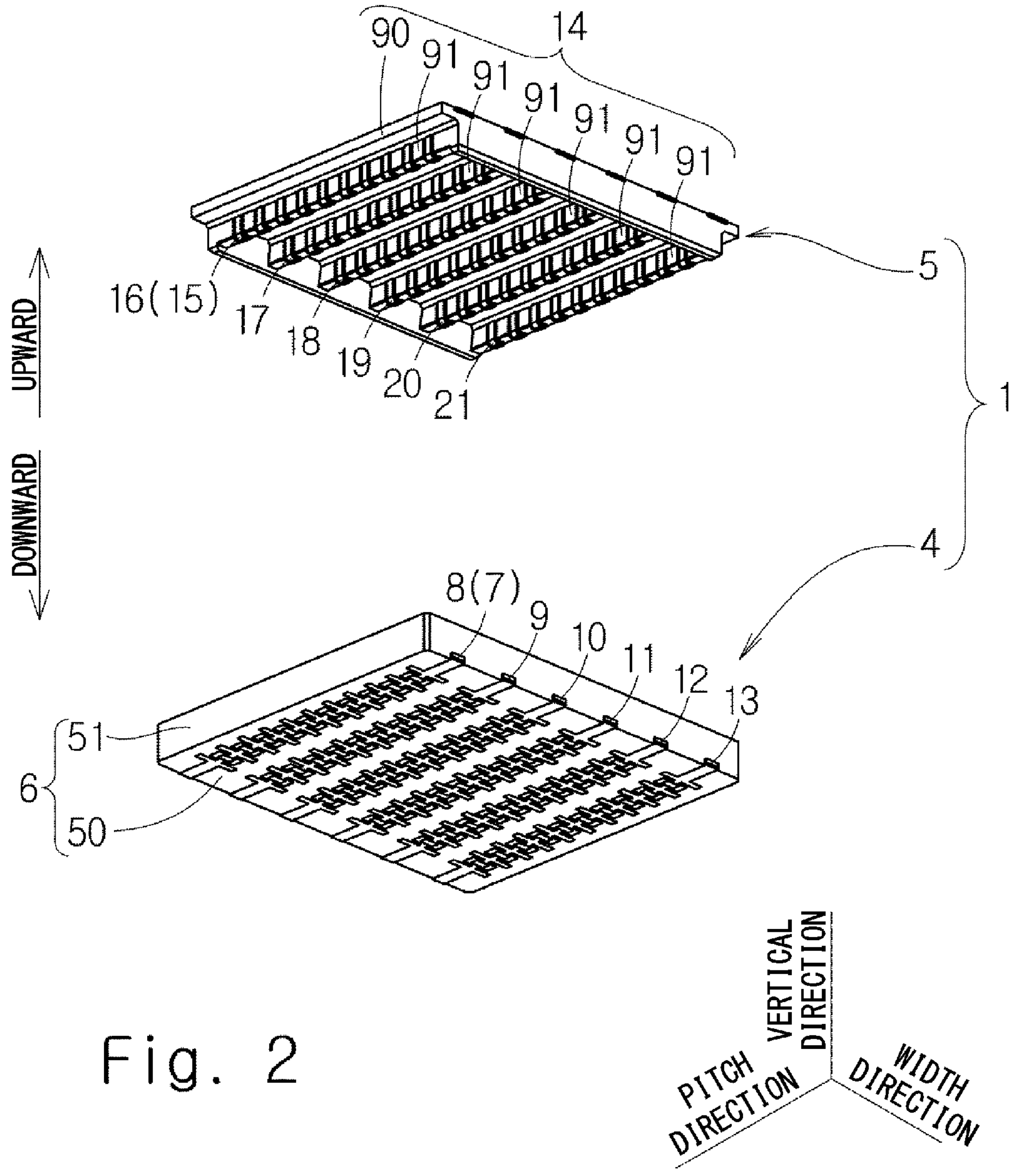
FIG. 2 is a perspective view of the connector assembly when viewed from another angle.

FIGS. 1 and 2 show a connector assembly 1. As shown in FIGS. 1 and 2, the connector assembly 1 mechanically and electrically connects a lower board 2 (receptacle side board, first board, board) and an upper board 3 (plug side board, second board, board). The connector assembly 1 includes a receptacle 4 (receptacle connector, connector) that is surface-mounted on a connector mounting surface 2A of the lower board 2 and a plug 5 (plug connector, connector) that is surface-mounted on a connector mounting surface 3A of the upper board 3. The connector assembly 1 according to this embodiment is a fine pitch and low profile surface-mounting connector assembly where the number of cores is 60.

The lower board 2 and the upper board 3 may be a rigid board such as a paper phenolic board or a glass epoxy board, or a flexible board, for example. In the state where the plug 5 is mated with the receptacle 4, the upper board 3 is parallel to the lower board 2.

Figure 3:
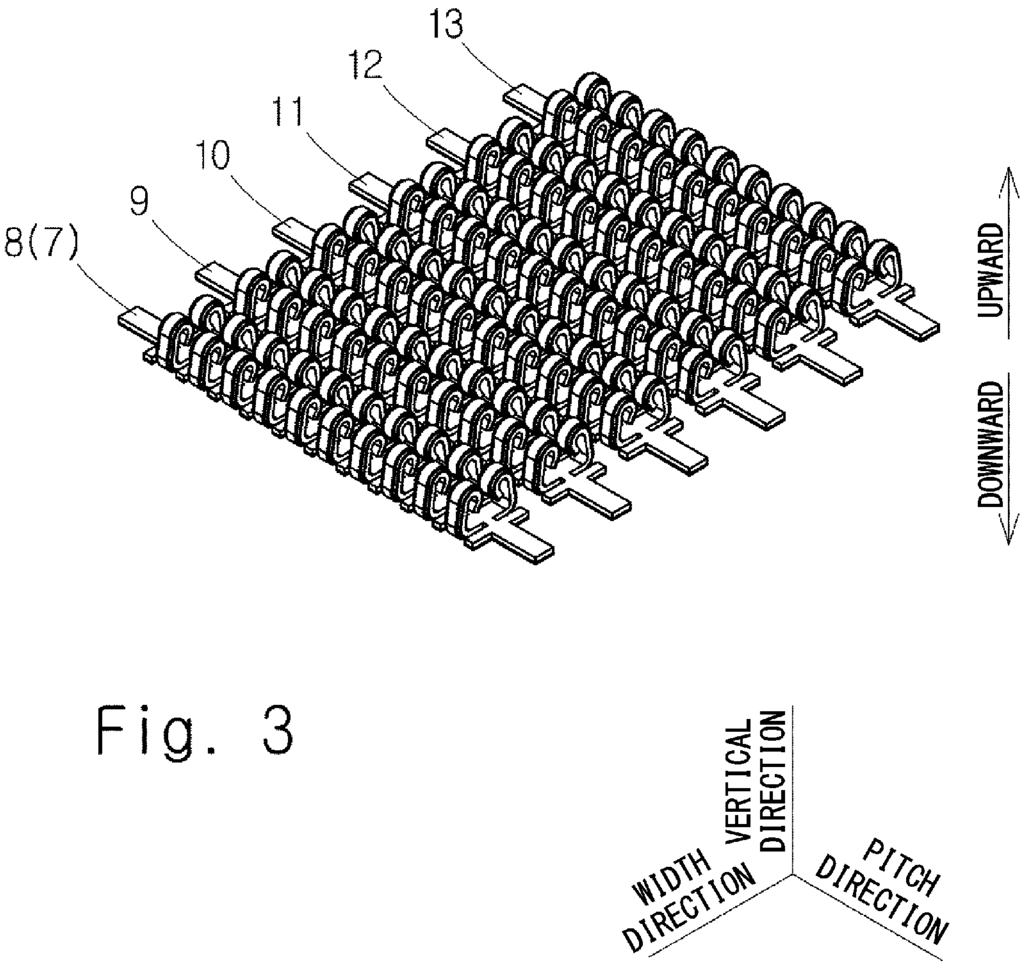
FIG. 3 is a perspective view of a plurality of receptacle contact assemblies arranged in a width direction.

The receptacle 4 includes a receptacle housing 6 made of insulating resin and a plurality of receptacle contact assemblies 7 (contact assemblies) integrally formed with the receptacle housing 6 by insert molding. The plurality of receptacle contact assemblies 7 include at least three receptacle contact assemblies 7. FIG. 3 shows the plurality of receptacle contact assemblies 7, where the receptacle housing 6 is omitted. As shown in FIG. 3, in this embodiment, the plurality of receptacle contact assemblies 7 include six receptacle contact assemblies 7. The six receptacle contact assemblies 7 include a first receptacle contact assembly 8, a second receptacle contact assembly 9, a third receptacle contact assembly 10, a fourth receptacle contact assembly 11, a fifth receptacle contact assembly 12, and a sixth receptacle contact assembly 13. Note that, however, the number of receptacle contact assemblies 7 that constitute the receptacle 4 is not limited as long as it is at least one. The plurality of receptacle contact assemblies 7 have the same shape.

Figure 4:
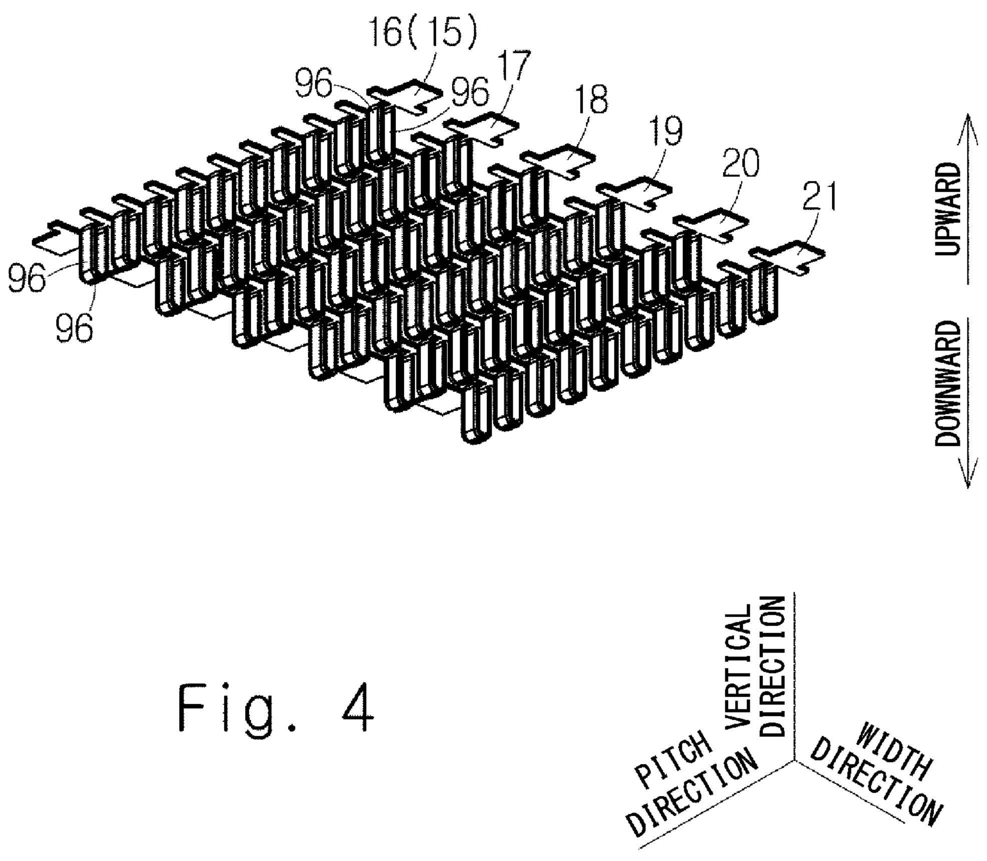
FIG. 4 is a perspective view of a plurality of plug contact assemblies arranged in the width direction.

Referring back to FIGS. 1 and 2, the plug 5 includes a plug housing 14 made of insulating resin and a plurality of plug contact assemblies 15 integrally formed with the plug housing 14 by insert molding. In this embodiment, the plurality of plug contact assemblies 15 include the same number of plug contact assemblies 15 as the number of the plurality of receptacle contact assemblies 7. FIG. 4 shows the plurality of plug contact assemblies 15, where the plug housing 14 is omitted. As shown in FIG. 4, in this embodiment, the plurality of plug contact assemblies 15 include six plurality of plug contact assemblies 15. The six plurality of plug contact assemblies 15 include a first plug contact assembly 16, a second plug contact assembly 17, a third plug contact assembly 18, a fourth plug contact assembly 19, a fifth plug contact assembly 20, and a sixth plug contact assembly 21. Note that, however, the number of plug contact assemblies 15 that constitute the plug 5 is not limited as long as it is at least one. The plurality of receptacle contact assemblies 15 have the same shape.

As shown in FIGS. 1 and 2, the first receptacle contact assembly 8, the second receptacle contact assembly 9, the third receptacle contact assembly 10, the fourth receptacle contact assembly 11, the fifth receptacle contact assembly 12, and the sixth receptacle contact assembly 13 correspond to the first plug contact assembly 16, the second plug contact assembly 17, the third plug contact assembly 18, the fourth plug contact assembly 19, the fifth plug contact assembly 20, and the sixth plug contact assembly 21, respectively.

A pitch direction, a width direction, and a vertical direction are defined as below. The pitch direction, the width direction, and the vertical direction are orthogonal to each other.

As shown in FIG. 3, the pitch direction is defined as the longitudinal direction of the first receptacle contact assembly 8 formed in an elongated shape. Referring to FIG. 1, the pitch direction includes inward in the pitch direction toward the center of the receptacle 4 in the pitch direction, and outward in the pitch direction receding from the center of the receptacle 4 in the pitch direction.

The vertical direction is orthogonal to the connector mounting surface 2A of the lower board 2. The vertical direction includes upward and downward. The upward direction is a direction in which the plug 5 moves relative to the receptacle 4 when removing the plug 5 from the receptacle 4. The downward direction is a direction in which the plug 5 moves relative to the receptacle 4 when mating the plug 5 with the receptacle 4. Thus, the vertical direction is the insertion and removal direction of the plug 5 to and from the receptacle 4.

The width direction is orthogonal to the pitch direction and the vertical direction as described above. The width direction includes inward in the width direction toward the center of the receptacle 4 in the width direction, and outward in the width direction receding from the center of the receptacle 4 in the width direction.

The above-described vertical direction is a direction defined by way of illustration only and should not be interpreted as limiting the position of the connector assembly 1 when actually used. Further, although each direction is defined using the structure of the receptacle 4 as described above, each direction is used also when describing the structure of the plug 5. For example, the pitch direction in the plug 5 coincides with the pitch direction of the receptacle 4 when the plug 5 is mated with the receptacle 4. Further, the width direction in the plug 5 coincides with the width direction of the receptacle 4 when the plug 5 is mated with the receptacle 4.

As shown in FIG. 3, all of the plurality of receptacle contact assemblies 7 extend in the pitch direction. Thus, the plurality of receptacle contact assemblies 7 extend parallel to one another. The plurality of receptacle contact assemblies 7 are arranged at predetermined intervals in the width direction. Further, the positions of the plurality of receptacle contact assemblies 7 in the pitch direction are aligned.

Likewise, as shown in FIG. 4, all of the plurality of plug contact assemblies 15 extend in the pitch direction. Thus, the plurality of plug contact assemblies 15 extend parallel to one another. The plurality of plug contact assemblies 15 are arranged at predetermined intervals in the width direction. Further, the positions of the plurality of plug contact assemblies 15 in the pitch direction are aligned.

Each receptacle contact assembly 7 is described hereinafter in detail with reference to FIGS. 5 to 10. Since the plurality of receptacle contact assemblies 7 have the same shape, the shape of the first receptacle contact assembly 8 is described as a representative, and description of the other receptacle contact assemblies 7 is omitted.

Figure 5:
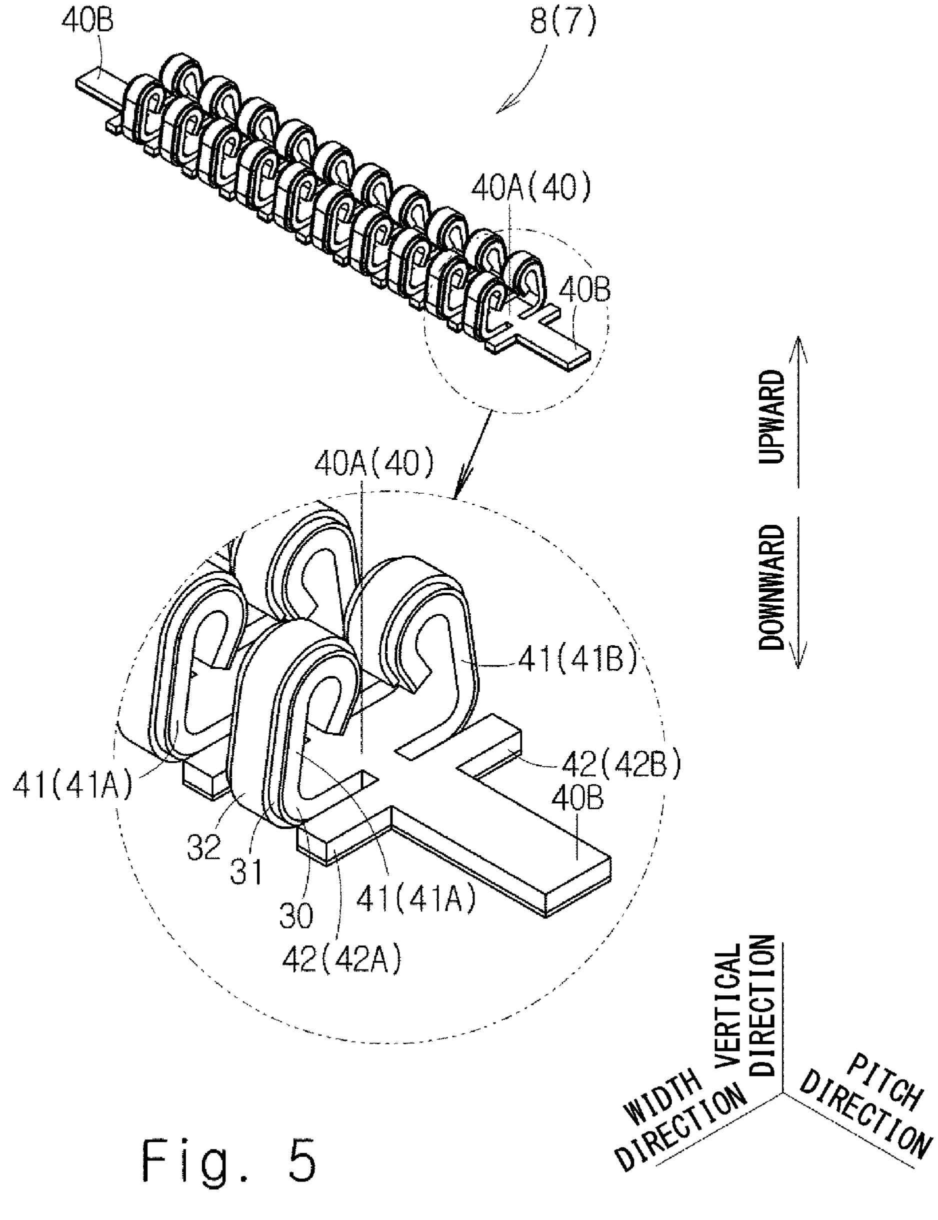
FIG. 5 is a perspective view of a receptacle contact assembly.
Figure 6:
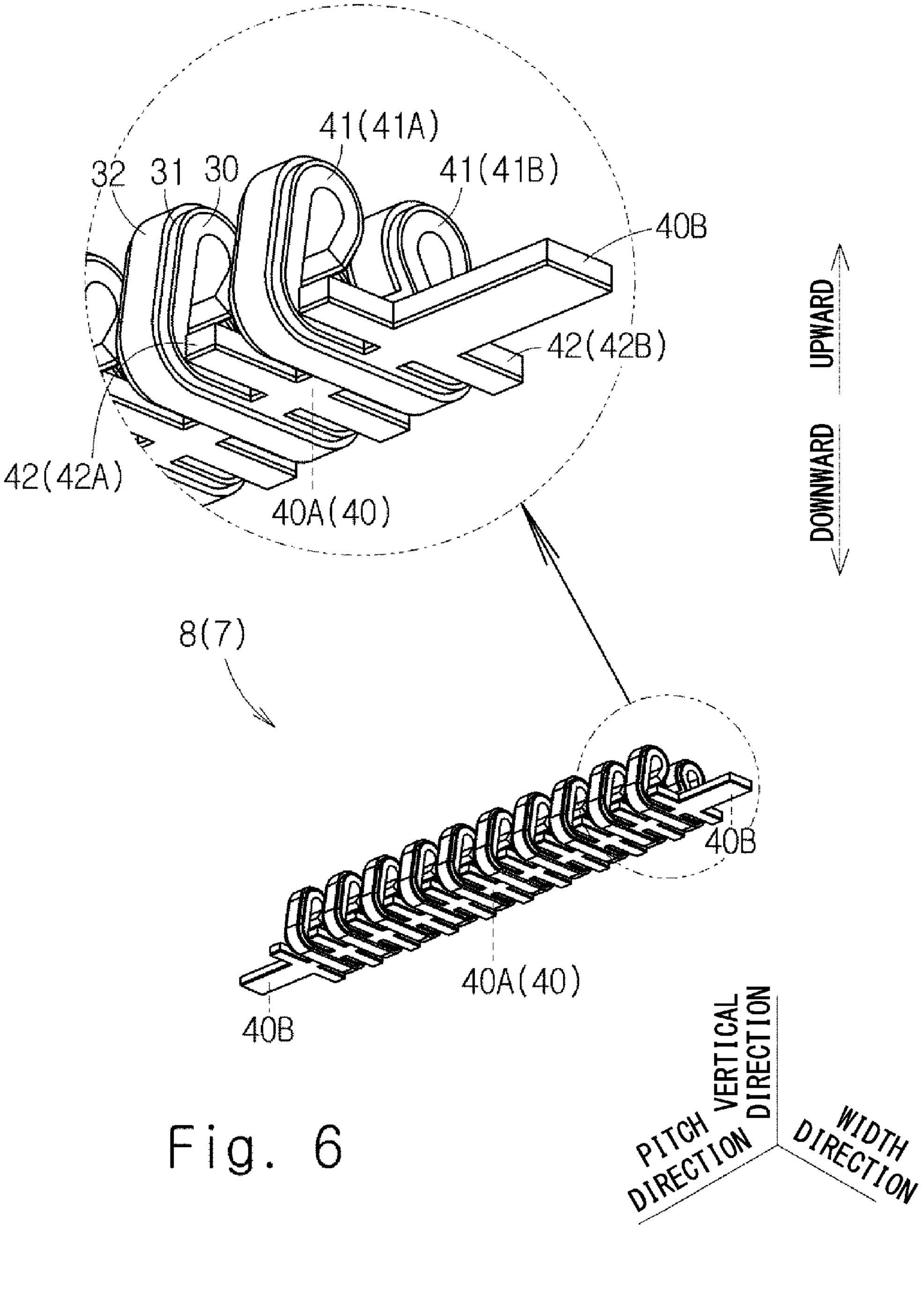
FIG. 6 is a perspective view of the receptacle contact assembly when viewed from another angle.
Figure 7:
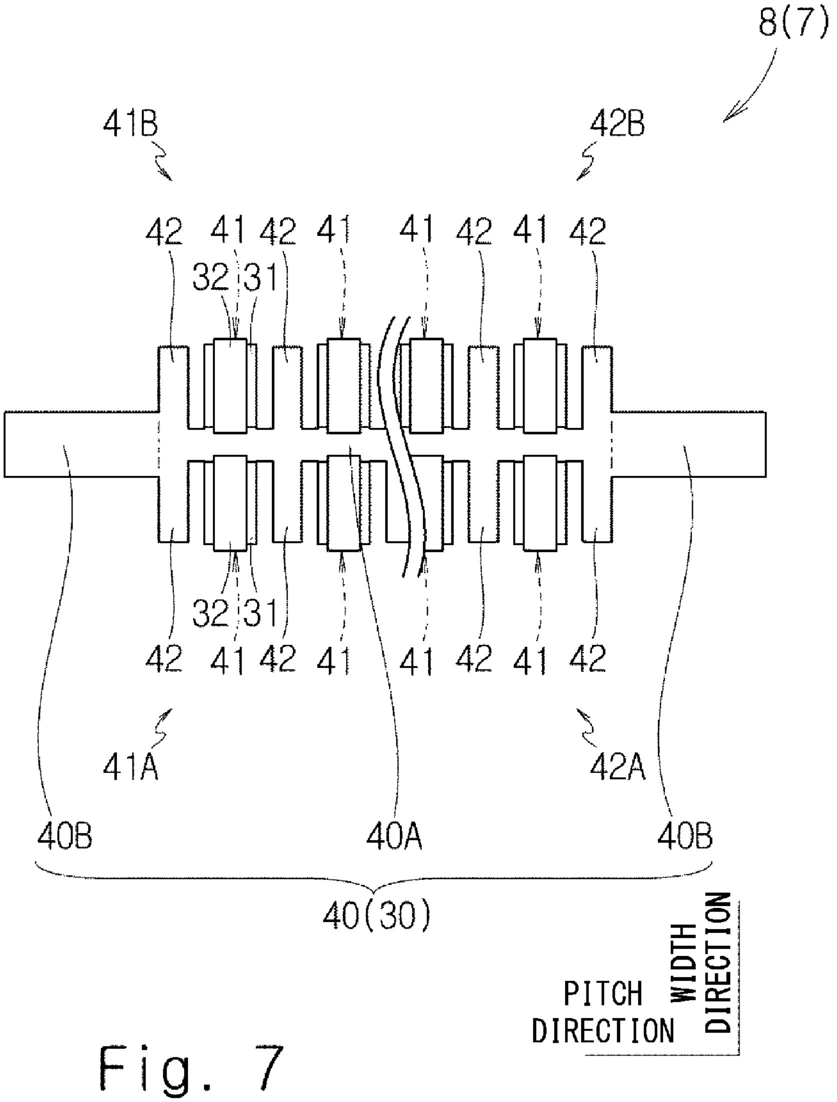
FIG. 7 is a plan view of the receptacle contact assembly.
Figure 8:
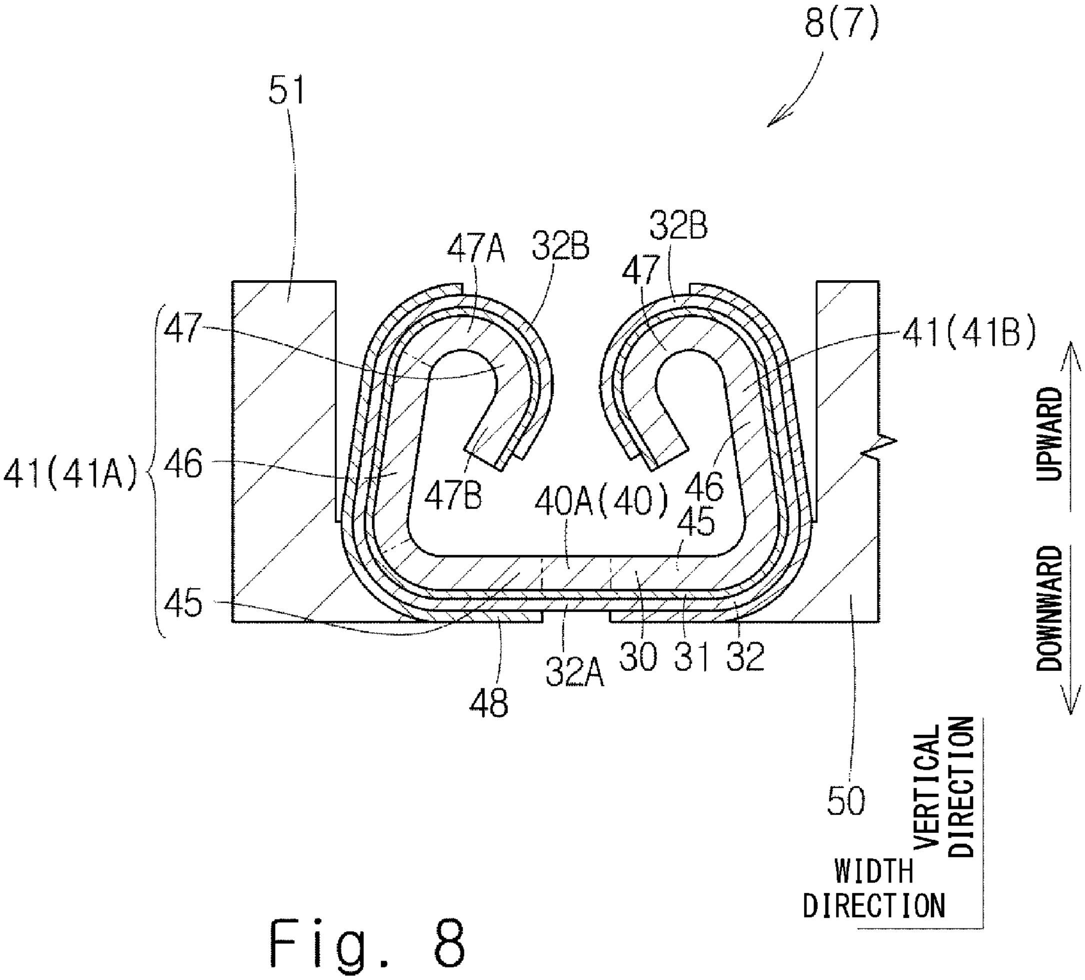
FIG. 8 is a cross-sectional view of the receptacle contact assembly.

FIGS. 5 and 6 are perspective views of the first receptacle contact assembly 8. FIG. 7 is a plan view of the first receptacle contact assembly 8. FIG. 8 is a cross-sectional view of the first receptacle contact assembly 8.

As shown in FIGS. 5, 6 and 8, the first receptacle contact assembly 8 has a trilaminar structure including a base 30, an insulating layer 31, and a plurality of conductive patterns 32. The base 30 is formed by punching and bending a conductive metal plate such as stainless, for example. The insulating layer 31 is typically polyimide or aramid, and it is placed on top of the lower board 2 so as to cover the base 30 from the lower board 2 side. The plurality of conductive patterns 32 are typically copper or copper alloy, and they are formed on the insulating layer 31.

Referring next to FIG. 7, the structure of the first receptacle contact assembly 8 is illustrated in a plan view. As shown in FIG. 7, the base 30 of the first receptacle contact assembly 8 includes a coupling base 40, a plurality of contact bases 41 projecting from the coupling base 40, and a plurality of shrinkage prevention beams 42 projecting from the coupling base 40. In other words, the coupling base 40 couples the plurality of contact bases 41 with one another and also couple the plurality of shrinkage prevention beams 42 with one another.

The coupling base 40 includes a coupling base body 40A and two coupling base extension parts 40B, each of which extends outward in the pitch direction from both ends of the coupling base body 40A in the pitch direction.

The plurality of contact bases 41 project from the coupling base body 40A of the coupling base 40. The plurality of contact bases 41 are disposed in two rows with the coupling base body 40A interposed therebetween in the width direction. Thus, each of the plurality of contact bases 41 belongs to either one of a first contact base row 41A and a second contact base row 41B. The first contact base row 41A and the second contact base row 41B are disposed on the opposite sides of each other with the coupling base body 40A of the coupling base 40 interposed therebetween. The plurality of contact bases 41 belonging to each row are disposed at predetermined intervals in the pitch direction. As shown in FIGS. 5 and 6, each contact base 41 bends upward from the coupling base body 40A of the coupling base 40. The plurality of contact bases 41 belonging to the first contact base row 41A and the plurality of contact bases 41 belonging to the second contact base row 41B are opposed to each other in the width direction.

Referring back to FIG. 7, the plurality of shrinkage prevention beams 42 project from the coupling base body 40A of the coupling base 40. The plurality of shrinkage prevention beams 42 are disposed in two rows with the coupling base body 40A interposed therebetween in the width direction. Thus, each of the plurality of shrinkage prevention beams 42 belongs to either one of a first shrinkage prevention beam row 42A and a second shrinkage prevention beam row 42B. The plurality of shrinkage prevention beams 42 belonging to each row are disposed at predetermined intervals in the pitch direction. As shown in FIGS. 5 and 6, each shrinkage prevention beam 42 extends linearly in the width direction from the coupling base body 40A of the coupling base 40.

As shown in FIG. 7, the plurality of contact bases 41 belonging to the first contact base row 41A and the plurality of shrinkage prevention beams 42 belonging to the first shrinkage prevention beam row 42A are disposed alternately in the pitch direction. Likewise, the plurality of contact bases 41 belonging to the second contact base row 41B and the plurality of shrinkage prevention beams 42 belonging to the second shrinkage prevention beam row 42B are disposed alternately in the pitch direction.

The shape of each contact base 41 is described in detail hereinafter with reference to FIG. 8. Since the shape of each contact base 41 belonging to the first contact base row 41A and the shape of each contact base 41 belonging to the second contact base row 41B are symmetric, the shape of each contact base 41 belonging to the first contact base row 41A is described below, and description of the shape of each contact base 41 belonging to the second contact base row 41B is omitted.

As shown in FIG. 8, the contact base 41 is supported like a cantilever beam by the coupling base body 40A of the coupling base 40. The contact base 41 includes a horizontal part 45, an extension part 46, and a contact part 47 in this recited order from the root to the distal end of the contact base 41. In FIG. 8, the boundary between the coupling base body 40A and the horizontal part 45, the boundary between the horizontal part 45 and the extension part 46, and the boundary between the extension part 46 and the contact part 47 are shown by chain double-dashed lines for better understanding.

The horizontal part 45 projects linearly in the width direction from the coupling base body 40A. The horizontal part 45 is embedded in the receptacle housing 6 and thereby fixed to the receptacle housing 6 in such a way that it is not elastically deformable.

The extension part 46 elastically supports the contact part 47 in such a way that the contact part 47 is elastically displaceable in the width direction. The extension part 46 extends to be inclined upward from the distal end of the horizontal part 45 so as to be closer to the second contact base row 41B.

The contact part 47 is a part that comes into contact with a contact of the plug 5. The contact part 47 includes a curve part 47A that curves to be convex upward from the upper end of the extension part 46 and comes closer to the second contact base row 41B and a removal guide part 47B that extends to be inclined downward from the distal end of the curve part 47A so as to be away from the second contact base row 41B.

In this structure, the extension part 46 and the contact part 47 are not embedded in the receptacle housing 6 and thereby elastically deformable. The contact part 47 is supported by the horizontal part 45 through the extension part 46, so that it is displaceable in the width direction as the extension part 46 is elastically deformed.

Referring still to FIG. 8, each conductive pattern 32 is formed from one to the other one of the two contact bases 41 opposed to each other in the width direction. To be specific, each conductive pattern 32 runs from the contact part 47 of the contact base 41 belonging to the first contact base row 41A, through the extension part 46, the horizontal part 45, the coupling base body 40A, the horizontal part 45 and the extension part 46 of the contact base 41 belonging to the second contact base row 41B in this recited order, and reaches the contact part 47 of the contact base 41 belonging to the second contact base row 41B. Each conductive pattern 32 is formed on the insulating layer 31 and thereby functions as a contact.

Each conductive pattern 32 includes a coupling pattern 32A that is opposed to the coupling base body 40A with the insulating layer 31 interposed therebetween, and two contact pattern parts 32B opposed to the two contact bases 41 opposed to each other in the width direction with the insulating layer 31 interposed therebetween. The two contact pattern parts 32B are electrically connected to each other through the coupling pattern 32A.

Figure 9:
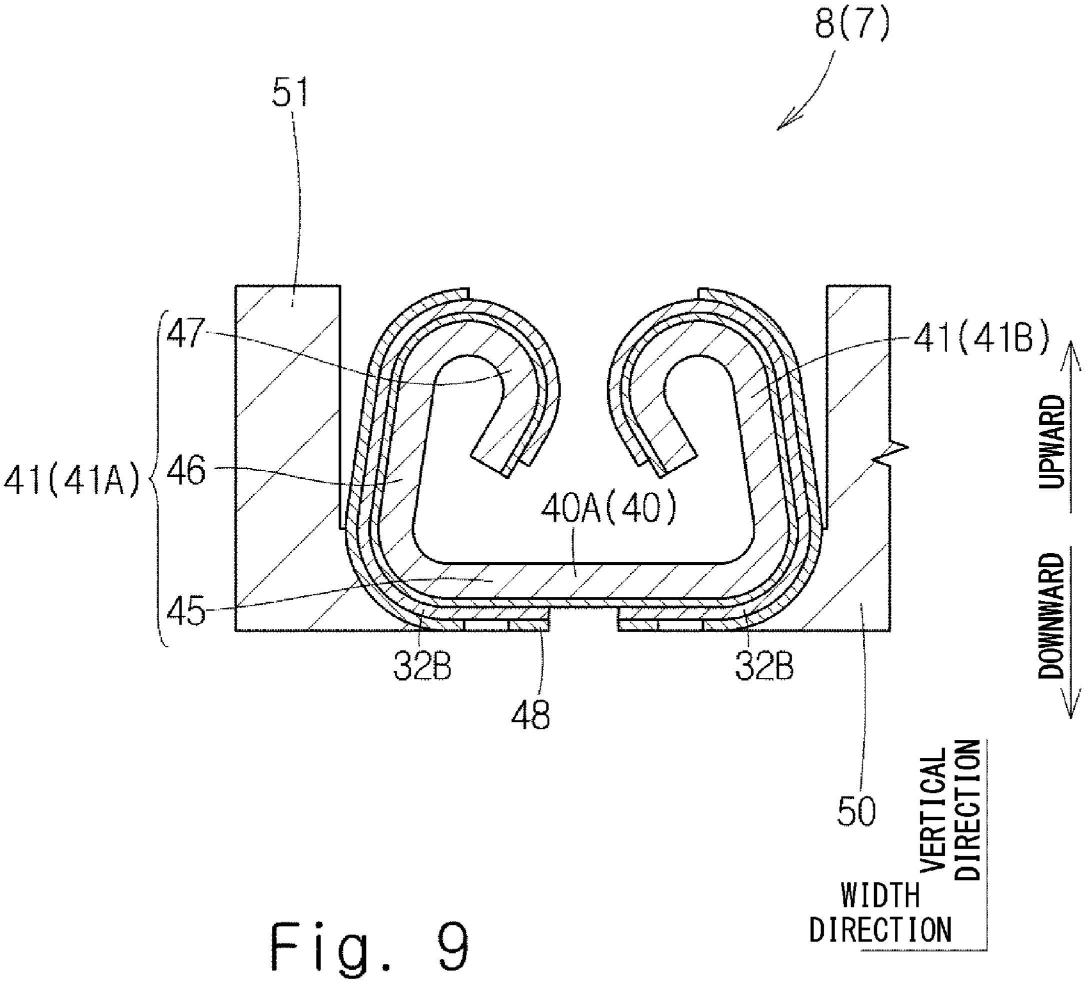
FIG. 9 is a cross-sectional view of the receptacle contact assembly.

Note that, as shown in FIG. 9, the two contact pattern parts 32B may be electrically independent of each other. In this structure, the number of cores increases with a simple structure. In this case, the two contact pattern parts 32B can be used as two contacts for differential transmission, for example.

Referring back to FIG. 8, in this embodiment, each conductive pattern 32 is mostly covered with a resist 48. Specifically, the resist 48 is placed on the opposite side of the insulating layer 31 with each conductive pattern 32 interposed therebetween. The resist 48 primarily prevents unintended electrical contact of each conductive pattern 32 with the lower board 2 or the plug 5, for example. The resist 48 does not cover the coupling pattern 32A. Thus, the coupling pattern 32A of each conductive pattern 32 can be soldered to a corresponding electrode pad of the lower board 2. Further, the resist 48 does not cover a part of the contact pattern part 32B that is opposed to the contact part 47. Thus, the resist 48 does not inhibit electrical contact between the contact pattern parts 32B of each conductive pattern 32 and the contact of the plug 5.

Referring back to FIGS. 1 and 2, the receptacle housing 6 includes a bottom plate 50 and a peripheral wall 51.

The bottom plate 50 is formed in a rectangular plate shape when viewed from above, and its thickness direction coincides with the vertical direction. The coupling base 40 of each receptacle contact assembly 7 shown in FIGS. 6 and 8, the horizontal part 45 of the plurality of contact bases 41, and the plurality of shrinkage prevention beams 42 are embedded in the bottom plate 50. The stiffness of the bottom plate 50 mainly against bending is thereby ensured. Further, the cooling rate of the receptacle housing 6 is equalized in the width direction by excellent thermal conduction of each shrinkage prevention beam 42, which prevents the occurrence of a sink mark of the receptacle housing 6 and thereby improves the yield of the receptacle 4.

Further, as shown in FIG. 8, a part of each conductive pattern 32 that is opposed to the horizontal part 45 is embedded in the bottom plate 50, which effectively prevents solder wicking and flux wicking when soldering the coupling pattern 32A of each conductive pattern 32 to a corresponding electrode pad of the lower board 2.

Referring back to FIG. 1, the peripheral wall 51 is formed to project upward from the peripheral edge of the bottom plate 50. The peripheral wall 51 has a peripheral surface 51A. The coupling base extension parts 40B of the coupling base 40 of the base 30 of each receptacle contact assembly 7 projects slightly outward from the peripheral surface 51A in the pitch direction. Specifically, a sectional surface 40C facing outward in the pitch direction of the coupling base extension parts 40B of the coupling base 40 of the base 30 of each receptacle contact assembly 7 is located slightly outside the peripheral surface 51A in the pitch direction. Alternatively, the sectional surface 40C may be flush with the peripheral surface 51A, or it may be located slightly inside the peripheral surface 51A in the pitch direction. Note that, in this embodiment, as shown in FIG. 1, the insulating layer 31 laminated on the coupling base extension parts 40B and the resist 48 also project slightly outward from the peripheral surface 51A in the pitch direction, just like the coupling base extension parts 40B.

Figure 10:
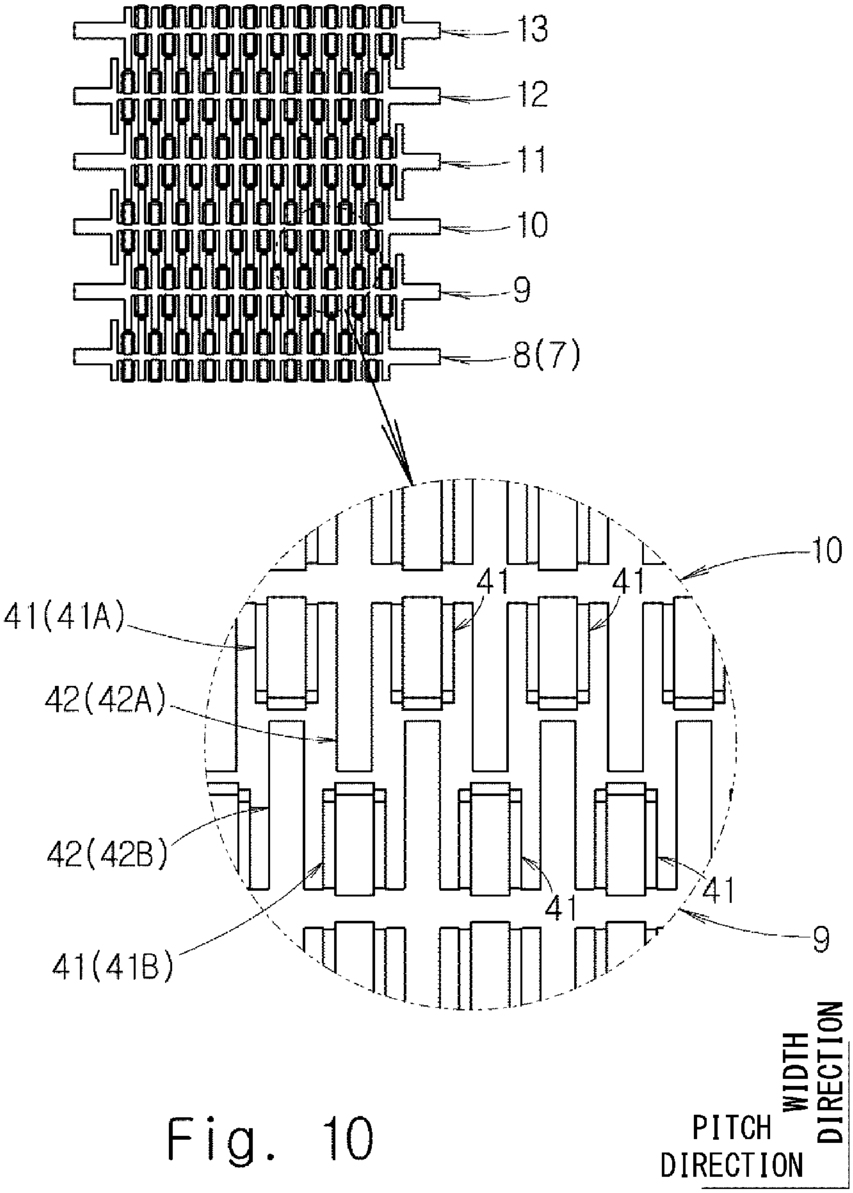
FIG. 10 is a plan view of the plurality of receptacle contact assemblies arranged in the width direction.

Referring back to FIG. 3, in this embodiment, the positions of the plurality of receptacle contact assemblies 7 in the pitch direction are aligned. Thus, the plurality of contact bases 41 of the two receptacle contact assemblies 7 adjacent to each other in the width direction are opposed to each other in the width direction. Alternatively, as shown in FIG. 10, the plurality of contact bases 41 of the second receptacle contact assembly 9 and the plurality of contact bases 41 of the third receptacle contact assembly 10 may be disposed in a staggered manner in such a way that the plurality of contact bases 41 of the second receptacle contact assembly 9 and the plurality of contact bases 41 of the third receptacle contact assembly 10 are not opposed to each other in the width direction. In this case, the plurality of shrinkage prevention beams 42 may be extended in such a way that the plurality of shrinkage prevention beams 42 of the second receptacle contact assembly 9 and the plurality of shrinkage prevention beams 42 of the third receptacle contact assembly 10 are opposed to each other in the pitch direction. In this case, the stiffness of the receptacle housing 6 is further enhanced, and the cooling rate of the receptacle housing 6 is further equalized.

Figure 11:
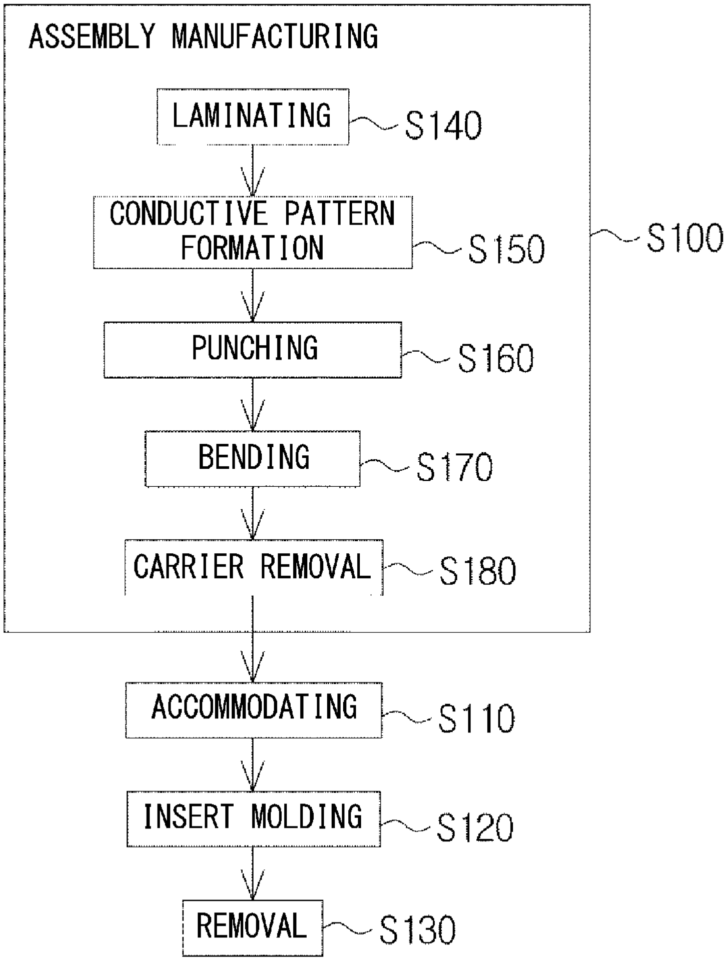
FIG. 11 is a manufacturing flow of a receptacle connector.

A method of manufacturing the receptacle 4 is described hereinafter with reference to FIGS. 11 to 18. FIG. 11 shows a manufacturing flow of the receptacle 4. As shown in FIG. 11, the manufacturing method of the receptacle 4 includes an assembly manufacturing step (S100), an accommodating step (S110), an insert molding step (S120), and a removal step (S130). In the manufacture of the receptacle 4, the plurality of receptacle contact assemblies 7 are first manufactured separately, and then insert molding is performed to form the receptacle housing 6 integrally with the plurality of receptacle contact assemblies 7. Separately manufacturing the plurality of receptacle contact assemblies 7 means that the plurality of receptacle contact assemblies 7 are not coupled with one another before insert molding.

Assembly Manufacturing Step (S100):

In the assembly manufacturing step, the plurality of receptacle contact assemblies 7 shown in FIG. 3 are manufactured separately. The assembly manufacturing step includes a laminating step (S140), a conductive pattern formation step (S150), a punching step (S160), a bending step (S170), and a carrier removal step (S180).

Laminating Step (S140):

In the laminating step (S140), a hoop material made of stainless is prepared, and an insulating layer is laminated on one surface of the hoop material.

Figure 12:
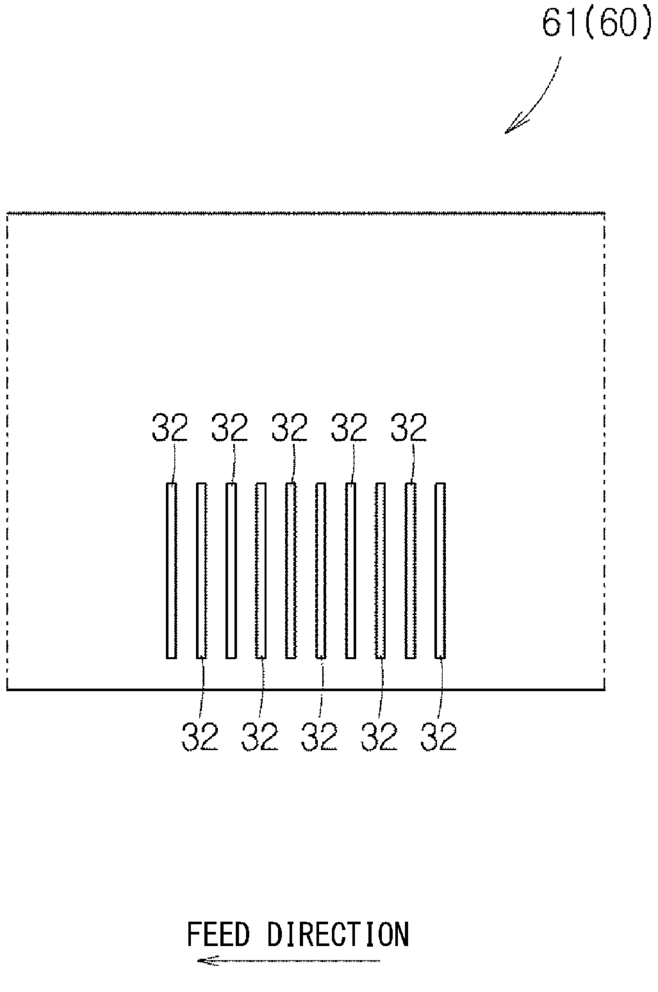
FIG. 12 is a plan view of a hoop material on which a plurality of conductive patterns are formed.

Conductive Pattern Formation Step (S150):

Next, as shown in FIG. 12, the plurality of conductive patterns 32 are formed as contacts on an insulating layer 61 laminated on a hoop material 60. Note that the chain double-dashed lines in FIG. 12 indicate that the hoop material 60 continues along the feed direction of the hoop material 60. The same applies to FIGS. 13 and 14.

Figure 13:
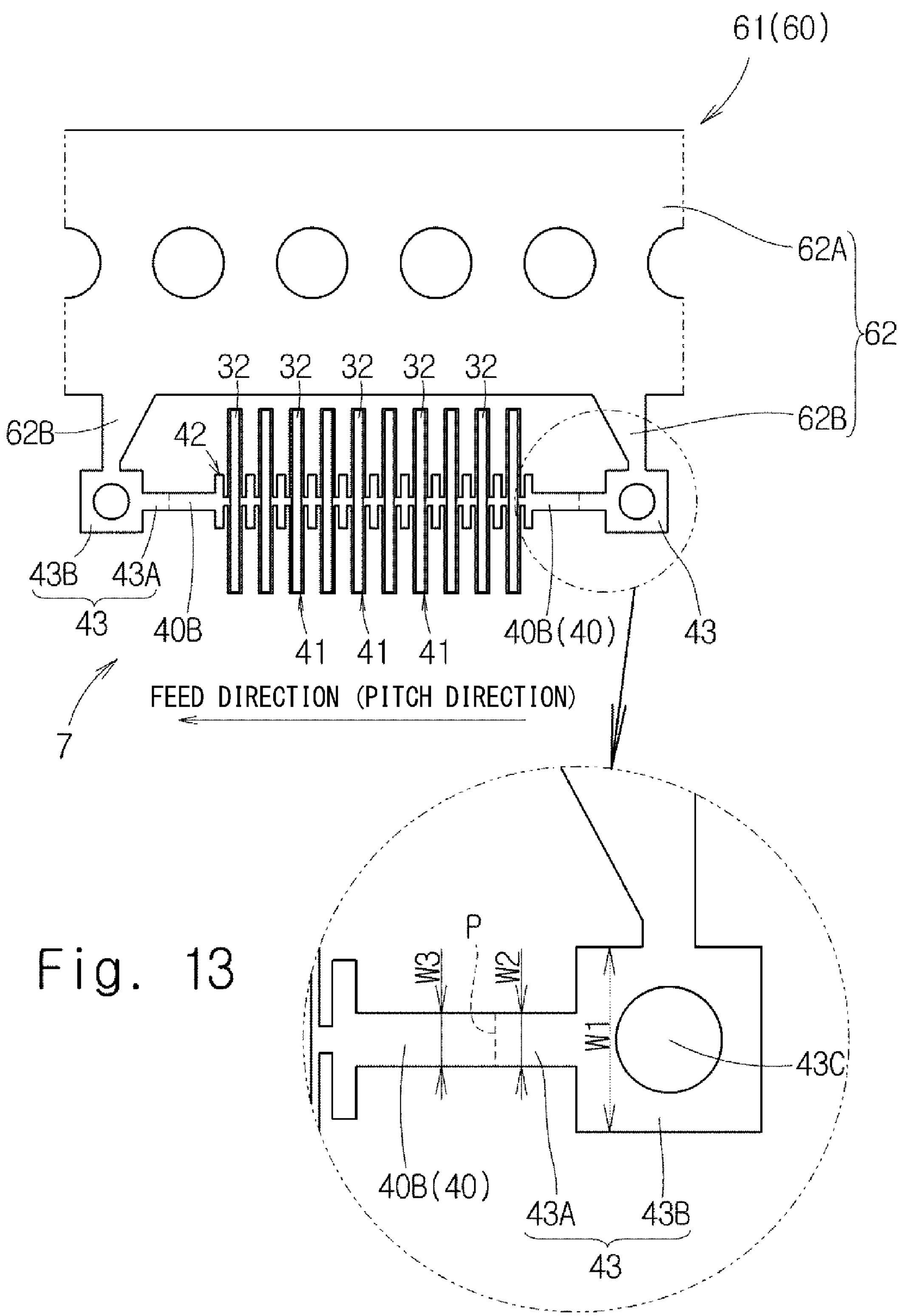
FIG. 13 is a plan view of the hoop material after punching.

Punching Step (S160):

Then, as shown in FIG. 13, the hoop material 60 is punched to form the receptacle contact assembly 7 and a carrier 62. In this embodiment, the pitch direction of the receptacle contact assembly 7 coincides with the feed direction of the hoop material 60.

As shown in FIG. 13, to be specific, the hoop material 60 is punched in such a way that the base 30 of the receptacle contact assembly 7 includes two supporting bases 43 with the coupling base 40 interposed therebetween in the pitch direction. In FIG. 13, a boundary P between the coupling base 40 and the two supporting bases 43 is shown by a dashed line. As shown in FIG. 13, each supporting base 43 extends outward in the pitch direction from the corresponding coupling base extension part 40B of the coupling base 40. Each supporting base 43 includes a connection part 43A connecting to the coupling base extension part 40B and a positioning part 43B disposed outward in the pitch direction of the connection part 43A. The positioning part 43B and the connection part 43A of one supporting base 43, the coupling base 40, and the connection part 43A and the positioning part 43B of the other supporting base 43 are disposed in a row in this recited order in the pitch direction. Thus, as described above, the coupling base 40 is interposed between the two supporting bases 43 in the pitch direction.

Each positioning part 43B is formed to be wider than each connection part 43A. Specifically, a width W1 of the positioning part 43B in the width direction is larger than a width W2 of each connection part 43A in the width direction. A width W3 of each coupling base extension parts 40B in the width direction is equal to the width W2. Each positioning part 43B has a positioning hole 43C. The positioning hole 43C is typically a circular hole.

The carrier 62 includes a carrier body 62A that extends in the pitch direction and two carrier coupling parts 62B that couple the carrier body 62A respectively to the two supporting bases 43 of the receptacle contact assembly 7.

Figure 14:
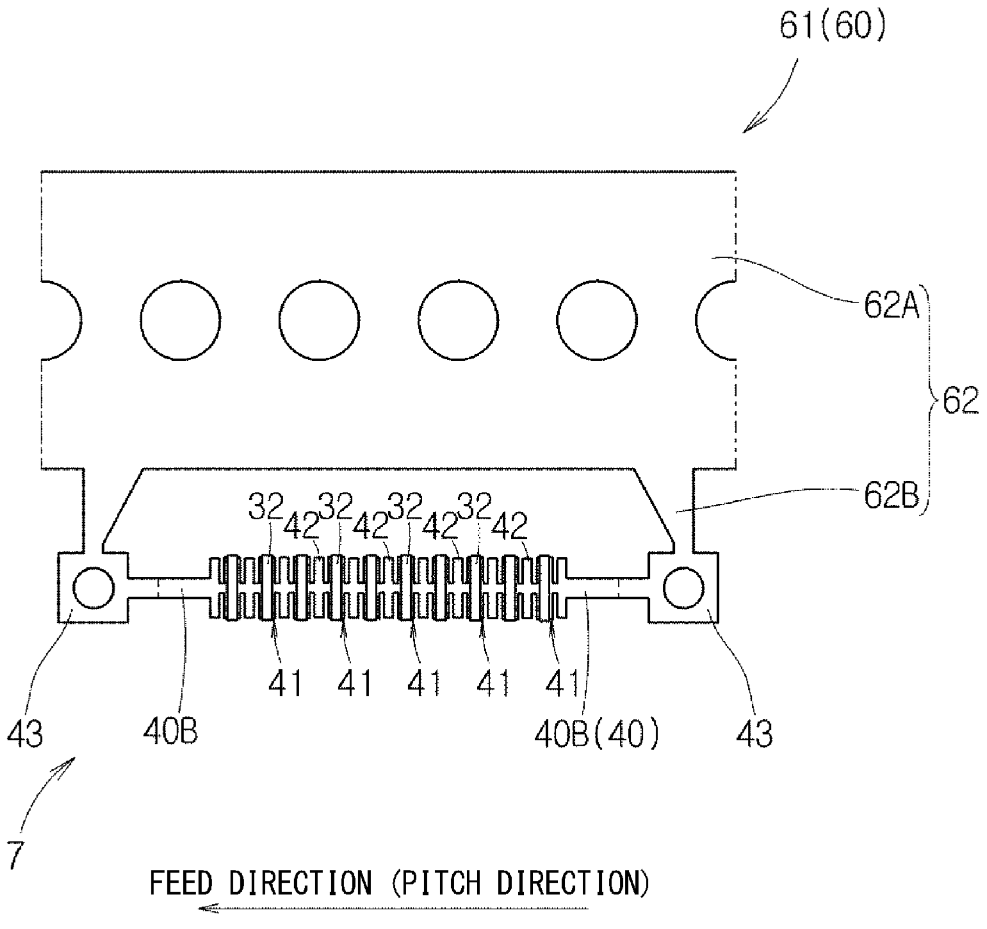
FIG. 14 is a plan view of the hoop material after bending.

Bending Step (S170):

Then, as shown in FIG. 14, the plurality of contact bases 41 projecting from the coupling base body 40A are bent at least in the thickness direction of the coupling base body 40A. To be specific, the plurality of contact bases 41 are bent toward the back of the paper in FIG. 14. Refer to FIGS. 5, 6 and 8 for the way of bending each contact base 41.

Carrier Removal Step (S180):

Then, the carrier 62 is separated from the receptacle contact assembly 7. To be specific, the two carrier coupling parts 62B of the carrier 62 are cut off near the corresponding positioning part 43B.

Figure 16:
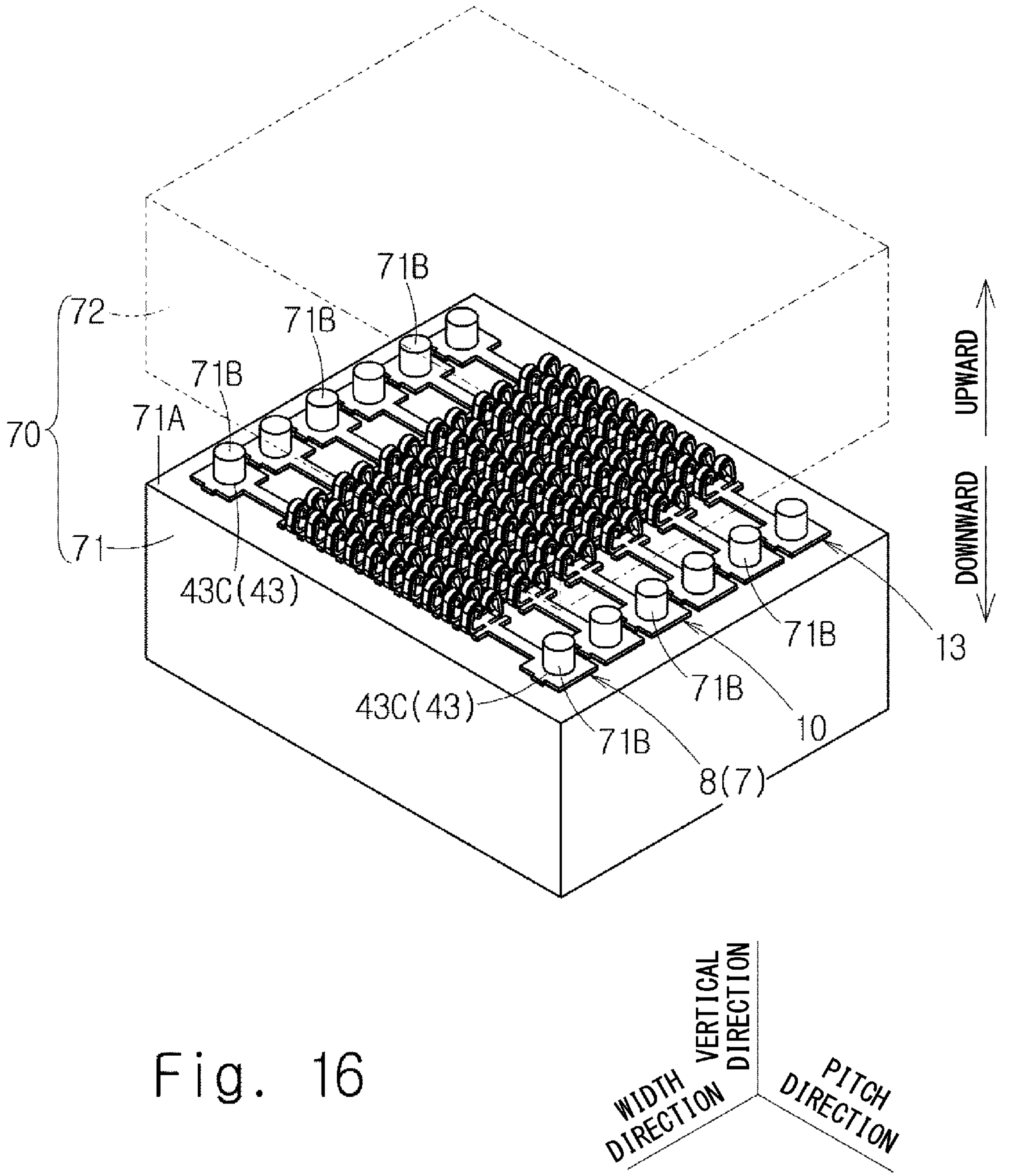
FIG. 16 is a perspective view of an injection mold in which a plurality of receptacle contact assemblies are set.

Accommodating Step (S110):

FIGS. 16 and 17 show an injection mold 70 for injection molding of the receptacle housing 6. The injection mold 70 includes a stationary plate 71 and a movable plate 72. The movable plate 72 is vertically movable relative to the stationary plate 71. As shown in FIG. 16, when accommodating the receptacle contact assembly 7 into the injection mold 70, in the state where the injection mold 70 opens, the plurality of receptacle contact assemblies 7 are set to a division surface 71A of the stationary plate 71 by using a plurality of positioning pins 71B projecting upward from the division surface 71A of the stationary plate 71. At this moment, each positioning pin 71B is inserted into each positioning hole 43C of the receptacle contact assembly 7, so that the receptacle contact assembly 7 is in position with respect to the stationary plate 71 in the pitch direction and the width direction. Since the two positioning pins 71B are inserted into the two positioning holes 43C for positioning of one receptacle contact assembly 7, the receptacle contact assembly 7 is inhibited from horizontally rotating in the state where the receptacle contact assembly 7 is set to the division surface 71A of the stationary plate 71. Further, since the two positioning holes 43C are formed as far as possible from each other in the pitch direction, highly accurate positioning of the receptacle contact assembly 7 with respect to the stationary plate 71 is achieved.

Figure 15:
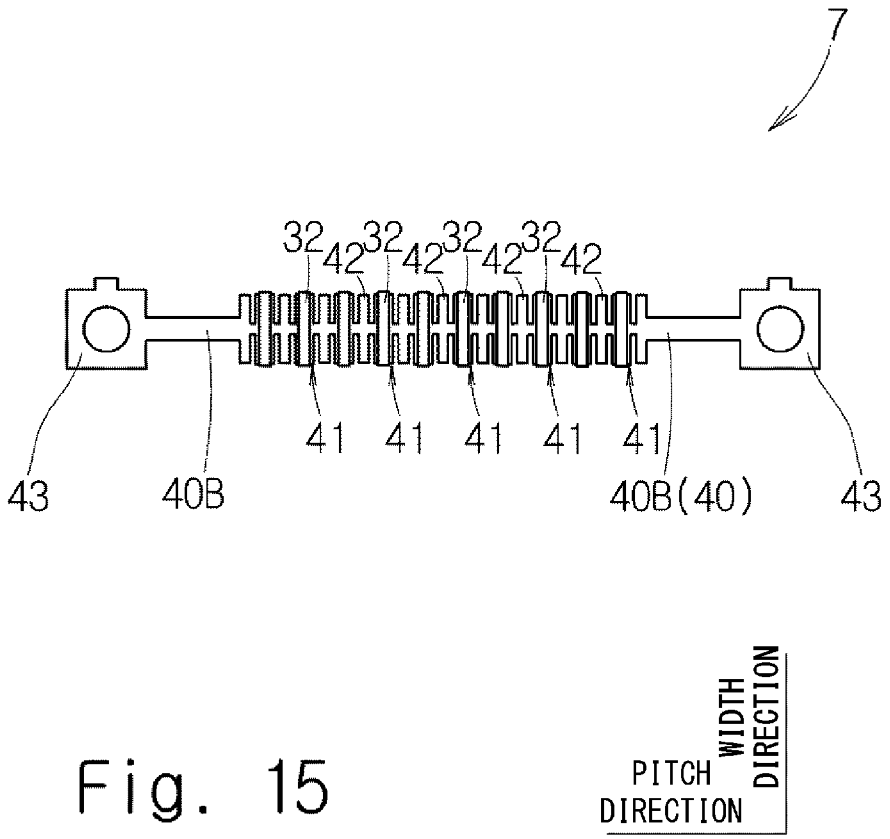
FIG. 15 is a plan view of a receptacle contact assembly.

Further, as shown in FIGS. 14 to 16, the plurality of receptacle contact assemblies 7 are manufactured separately. Thus, as shown in FIG. 16, the plurality of receptacle contact assemblies 7 can be disposed closer to one another in the width direction, which contributes to reducing the size of the receptacle 4 in the width direction. If the plurality of receptacle contact assemblies 7 are manufactured in the state where they are coupled to each other and then insert molding is performed with this coupled state, the contact bases 41 of the two receptacle contact assemblies 7 adjacent to each other in the width direction need to be extremely short. This is because the contact bases 41 of the two receptacle contact assemblies 7 adjacent to each other in the width direction overlap with each other in the development view of the two receptacle contact assemblies 7 adjacent to each other in the width direction.

Next, as shown in FIG. 17, the injection mold 70 is clamped. At this moment, the receptacle contact assembly 7 is supported at both ends in the injection mold 70 by using the two supporting bases 43 of the receptacle contact assembly 7. To be specific, the positioning parts 43B of the two supporting bases 43 are sandwiched between the stationary plate 71 and the movable plate 72 in the vertical direction, and thereby the receptacle contact assembly 7 is supported at both ends in the injection mold 70.

Insert Molding Step (S120):

After that, molten resin is fed to a cavity of the injection mold 70. Then, the receptacle housing 6 is formed integrally with the plurality of receptacle contact assemblies 7 by insert molding. The receptacle housing 6 is formed by one insert molding process. The receptacle housing 6 is formed in a single cavity. The receptacle housing 6 is molded as one part.

Figure 18:
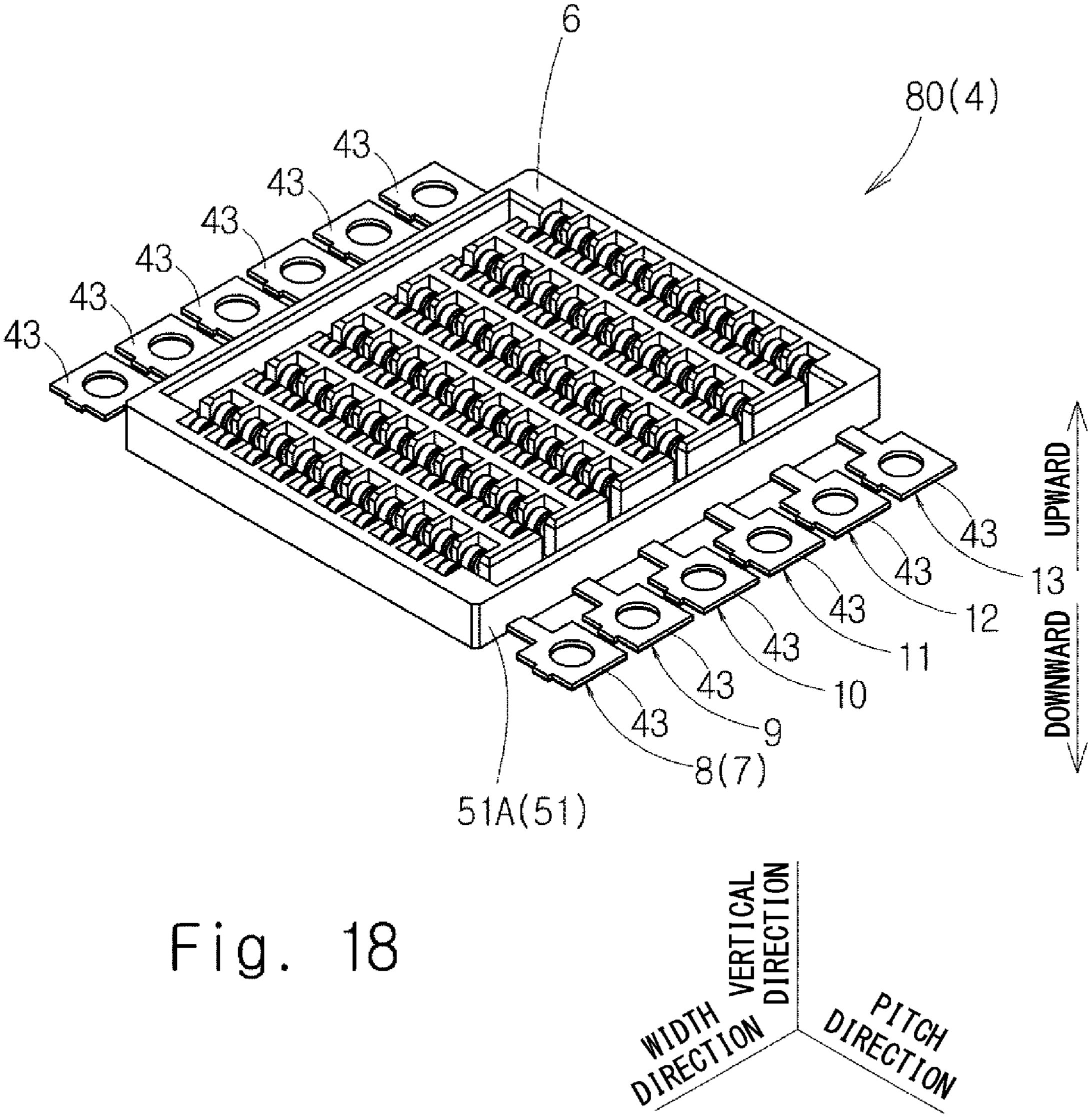
FIG. 18 is a perspective view of a receptacle connector.

FIG. 18 shows a molded product 80 retrieved from the injection mold 70. As shown in FIG. 18, in the insert molding step, the receptacle housing 6 is formed in such a way that the two supporting bases 43 of each receptacle contact assembly 7 are exposed outside the peripheral surface 51A of the peripheral wall 51 of the receptacle housing 6 in the pitch direction. In other words, the cavity of the injection mold 70 is designed in such a way that the two supporting bases 43 of each receptacle contact assembly 7 are not covered with the receptacle housing 6.

Removal Step (S130):

Then, as shown in FIG. 18, all of the supporting bases 43 exposed outside the receptacle housing 6 are removed. Typically, each supporting base 43 is cut off from the corresponding coupling base 40 by punching. FIG. 1 shows the sectional surface 40C of the coupling base 40 generated in this step. The receptacle 4 shown in FIG. 1 is thereby completed.

Note that, however, the supporting base 43 shown in FIG. 18 may be left without being cut off.

The plug 5 is described hereinafter with reference to FIGS. 2 to 19. The plug 5 is different from the receptacle 4 mainly in the shape of a contact base, and the other structure and the manufacturing method are substantially the same. Thus, in the following description of the plug 5, the same description as that of the receptacle 4 is omitted as appropriate.

As shown in FIG. 2, the plug 5 includes the plug housing 14 made of insulating resin and the plurality of plug contact assemblies 15 integrally formed with the plug housing 14 by insert molding.

Figure 19:
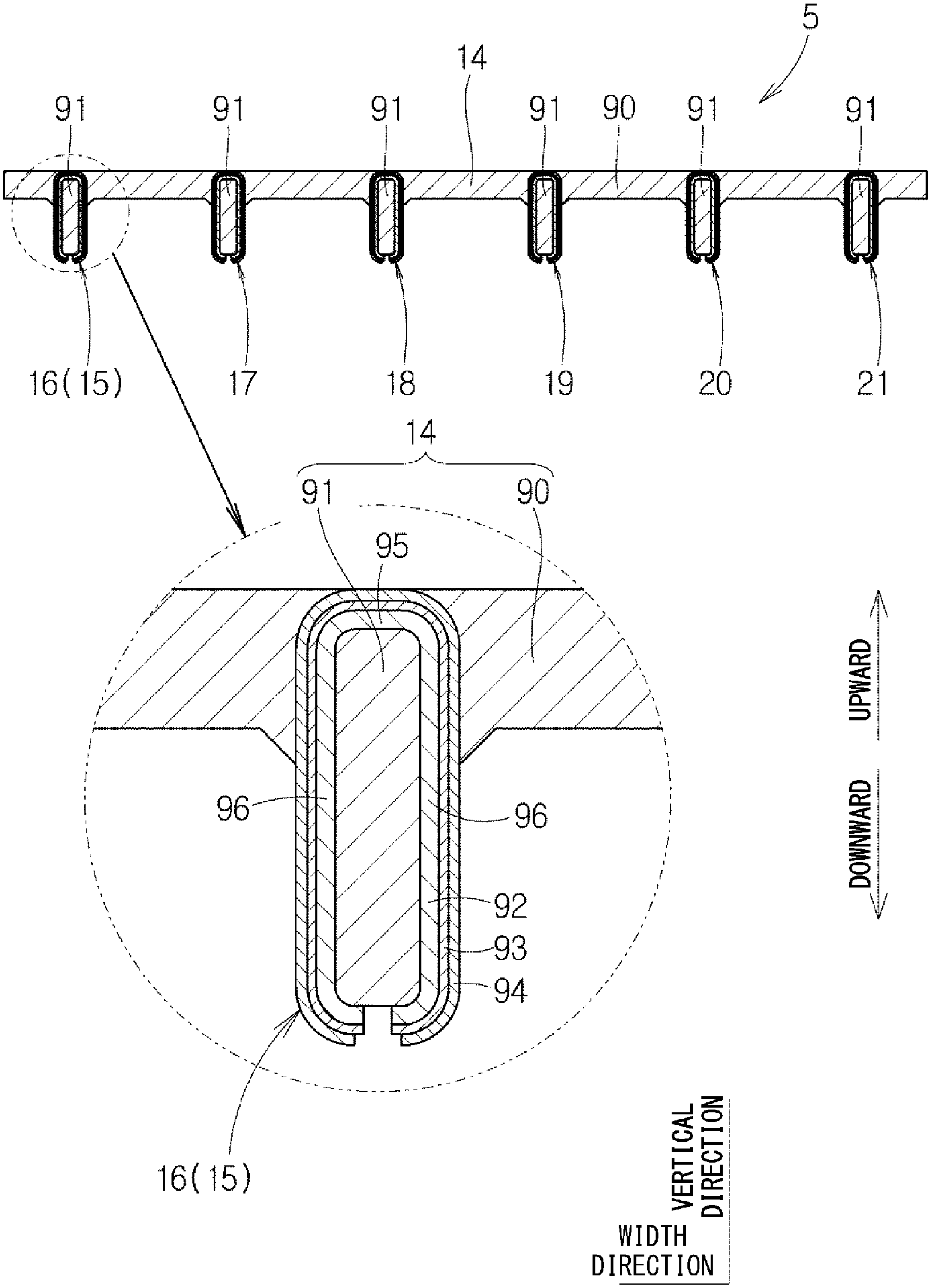
FIG. 19 is a cross-sectional view of a plug connector.
Figure 20:
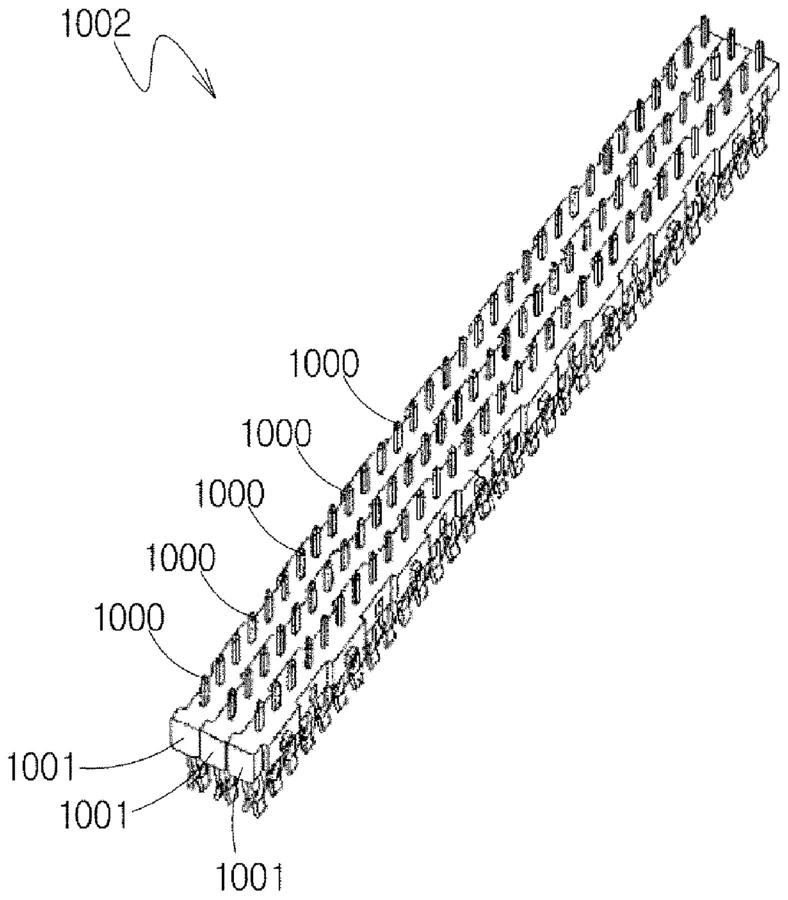
FIG. 20 is a simplified drawing of FIG. 1 of Patent Literature 1.

As shown in FIGS. 2 and 19, the plug housing 14 includes a bottom plate 90 and a plurality of ridge portions 91.

The bottom plate 90 is formed in a rectangular plate shape when viewed from above, and its thickness direction coincides with the vertical direction. The plurality of ridge portions 91 project downward from the bottom plate 90 and extend in the pitch direction. The plurality of plug contact assemblies 15 are respectively disposed in the plurality of ridge portions 91.

Referring now to FIG. 19, each plug contact assembly 15 is described hereinafter in detail. Since the plurality of plug contact assemblies 15 have the same shape, the shape of the first plug contact assembly 16 is described as a representative, and description of the other plug contact assemblies 15 is omitted.

The first plug contact assembly 16 has a trilaminar structure including a base 92, an insulating layer 93, and a plurality of conductive patterns 94, just like the receptacle contact assembly 7.

The base 92 includes a coupling base 95 and two contact bases 96 projecting from the coupling base 95 and opposed to each other with the ridge portion 91 interposed therebetween in the width direction. The two contact bases 96 respectively project downward from both ends in the width direction of the coupling base 95 and then bend to come closer to each other. Thus, the two contact bases 96 are disposed in such a way that the ridge portion 91 is interposed therebetween. The two contact bases 96 are fixed to the ridge portions 91 in such a way that they are not elastically deformable. Specifically, the two contact bases 96 are fixed to the ridge portions 91 in such a way that they are not relatively displaceable. Although the base 92 includes more contact bases 96 as shown in FIG. 4, description thereof is omitted.

In this structure, to mate the plug 5 shown in FIG. 1 with the receptacle 4, the plug 5 is inserted inside the peripheral wall 51 of the receptacle 4. Then, the two contact bases 96 shown in FIG. 19 are inserted between the two contact bases 41 shown in FIG. 8 as the two contact bases 41 recede from each other in the width direction. One conductive pattern 94 disposed to be opposed to the two contact bases 96 shown in FIG. 19 and one conductive pattern 32 disposed to be opposed to the two contact bases 41 shown in FIG. 8 are thereby electrically connected.

The embodiment of the present disclosure is described above, and the above-described first embodiment has the following features.

As shown in FIGS. 1 and 2, the receptacle 4 (connector) is formed by integrally molding the plurality of receptacle contact assemblies 7 (contact assemblies) extending parallel to one another and the receptacle housing 6 (housing) that accommodates the plurality of receptacle contact assemblies 7 by insert molding. As shown in FIGS. 5 to 8, each receptacle contact assembly 7 includes the base 30 made of metal including the plurality of contact bases 41 arranged in the pitch direction (the longitudinal direction of the receptacle contact assembly 7) and the coupling base 40 that couples the plurality of contact bases 41 with one another, and the plurality of conductive patterns 32 formed in the plurality of contact bases 41 with the insulating layer 31 interposed therebetween. As shown in FIG. 11, the manufacturing method of the receptacle 4 includes the assembly manufacturing step (S100), the accommodating step (S110), and the insert molding step (S120). The assembly manufacturing step (S100) manufactures each receptacle contact assembly 7 in such a way that the base 30 includes two supporting bases 43 with the coupling base 40 interposed therebetween in the pitch direction. The accommodating step (S110) accommodates the plurality of receptacle contact assemblies 7 into the injection mold 70 in such a way that each receptacle contact assembly 7 is supported at both ends in the injection mold 70 by using the two supporting bases 43. The insert molding step (S120) forms the receptacle housing 6 integrally with the plurality of receptacle contact assemblies 7 by insert molding. This method contributes to reducing the size of the receptacle 4 in the width direction. Further, this facilitates the manufacturing of the receptacle 4. Note that, as described earlier, the number of the receptacle contact assemblies 7 that constitute the receptacle 4 is not limited as long as it is at least one. The above-described technical effect is obtained in the plug 5 as well, and the same applies hereafter.

In this embodiment, "at least one contact assembly" is equivalent of the six receptacle contact assemblies 7 shown in FIG. 3.

As shown in FIGS. 1 and 2, the receptacle 4 (connector) is formed by integrally molding the plurality of receptacle contact assemblies 7 (contact assemblies) extending parallel to one another and the receptacle housing 6 (housing) that accommodates the plurality of receptacle contact assemblies 7 by insert molding. As shown in FIGS. 5 to 8, each receptacle contact assembly 7 includes the base 30 made of metal including the plurality of contact bases 41 arranged in the pitch direction (the longitudinal direction of the receptacle contact assembly 7) and the coupling base 40 that couples the plurality of contact bases 41 with one another, and the plurality of conductive patterns 32 formed in the plurality of contact bases 41 with the insulating layer 31 interposed therebetween. As shown in FIG. 3, the plurality of receptacle contact assemblies 7 include the first receptacle contact assembly 8 (first contact assembly), the second receptacle contact assembly 9 (second contact assembly), and the sixth receptacle contact assembly 13 (third contact assembly) in this recited order in the width direction. As shown in FIG. 11, the manufacturing method of the receptacle 4 includes the assembly manufacturing step (S100), the accommodating step (S110), and the insert molding step (S120). The assembly manufacturing step (S100) manufactures the second receptacle contact assembly 9 in such a way that the base 30 includes two supporting bases 43 with the coupling base 40 interposed therebetween in the pitch direction. The accommodating step (S110) accommodates the plurality of receptacle contact assemblies 7 into the injection mold 70 in such a way that the second receptacle contact assembly 9 is supported at both ends in the injection mold 70 by using the two supporting bases 43. The insert molding step (S120) forms the receptacle housing 6 integrally with the plurality of receptacle contact assemblies 7 by insert molding. This method contributes to reducing the size of the receptacle 4 in the width direction. Further, this facilitates the manufacturing of the receptacle 4.

In this embodiment, "at least one second contact assembly" is equivalent of the second receptacle contact assembly 9, the third receptacle contact assembly 10, the fourth receptacle contact assembly 11, and the fifth receptacle contact assembly 12 shown in FIG. 3.

Further, as shown in FIG. 17, in the accommodating step (S110), the two supporting bases 43 are sandwiched between the stationary plate 71 and the movable plate 72 in the moving direction of the movable plate 72 relative to the stationary plate 71 of the injection mold 70, and thereby the second receptacle contact assembly 9 is supported at both ends in the injection mold 70.

Further, as shown in FIG. 13, in the insert molding step (S120), the receptacle housing 6 is molded in such a way that the two supporting bases 43 of the second receptacle contact assembly 9 are exposed outside the peripheral surface 51A of the receptacle housing 6 in the pitch direction.

Further, as shown in FIG. 11, after the insert molding step, the method may further include the removal step (S130) that removes the two supporting bases 43 of the second receptacle contact assembly 9.

Further, as shown in FIGS. 13 to 16, in the assembly manufacturing step (S100), the second receptacle contact assembly 9 and the third receptacle contact assembly 10 are manufactured as separate parts. In this structure, the second receptacle contact assembly 9 and the third receptacle contact assembly 10 can be disposed closer to one another in the width direction, which contributes to reducing the size of the receptacle 4 in the width direction.

Further, as shown in FIG. 1, the sectional surface 40C of the base 30 of the second receptacle contact assembly 9 is observable when viewing the receptacle 4 along the pitch direction. Further, the base 30 of the second receptacle contact assembly 9 projects outward from the peripheral surface 51A of the receptacle housing 6. The sectional surface 40C of the base 30 of the second receptacle contact assembly 9 is located outside the peripheral surface 51A of the receptacle housing 6. This features that the two supporting bases 43 of the second receptacle contact assembly 9 shown in FIG. 18 are cut off after insert molding.

Further, as shown in FIG. 8, the plurality of contact bases 41 are formed to project upward from the coupling base 40 at least in the thickness direction of the coupling base 40. In the receptacle 4, the plurality of contact bases 41 are elastically deformable in the width direction. On the other hand, in the plug 5, the plurality of contact bases 96 are fixed to the ridge portions 91 and thereby not elastically deformable.

As shown in FIGS. 5 and 6, the plurality of contact bases 41 are disposed in two rows with the coupling base 40 interposed therebetween. The plurality of contact bases 41 belonging to one row and the plurality of contact bases 41 belonging to the other row are respectively opposed to each other in the width direction.

As shown in FIG. 8, the two contact pattern parts 32B (conductive patterns) formed respectively in the two contact bases 41 opposed to each other in the width direction are electrically connected to each other. Alternatively, as shown in FIG. 9, the two contact pattern parts 32B may be electrically independent of each other.

As shown in FIG. 7, the base 30 may include at least one shrinkage prevention beam 42 projecting in the width direction from the coupling base 40 and fixed to the receptacle housing 6. The at least one shrinkage prevention beam 42 may include two shrinkage prevention beams 42 projecting to recede from each other from the coupling base 40.

As shown in FIG. 8, each conductive pattern 32 is covered with the resist 48 except for a part in the contact base 41. This structure prevents unintended short-circuit.

Further, as shown in FIG. 10, the plurality of contact bases 41 of the second receptacle contact assembly 9 and the plurality of contact bases 41 of the third receptacle contact assembly 10 among the two receptacle contact assemblies 7 adjacent to each other may be arranged in a staggered manner so that they are not opposed to each other in the width direction. This structure allows the plurality of receptacle contact assemblies 7 to be disposed at smaller intervals in the width direction.

A part or the whole of the embodiments disclosed above can be described as, but not limited to, the following supplementary notes.

(Supplementary Note 1)

A manufacturing method of a connector, the connector being formed by integrally molding at least three contact assemblies extending parallel to one another with a housing accommodating the at least three contact assemblies by insert molding, each contact assembly including a base made of metal including a plurality of contact bases arranged in a longitudinal direction of the contact assembly and a coupling base coupling the plurality of contact bases with one another, and a plurality of conductive patterns formed in the plurality of contact bases with an insulating layer interposed therebetween, and the at least three contact assemblies including a first contact assembly, at least one second contact assembly, and a third contact assembly in this recited order in a direction orthogonal to the longitudinal direction, the method comprising:

an assembly manufacturing step of manufacturing the at least one second contact assembly in such a way that the base includes two supporting bases with the coupling base interposed therebetween in the longitudinal direction;

an accommodating step of accommodating the at least three contact assemblies into an injection mold in such a way that the at least one second contact assembly is supported at both ends in the injection mold by using the two supporting bases; and an insert molding step of molding the housing integrally with the at least three contact assemblies by insert molding.

(Supplementary Note 2)

A connector formed by integrally molding at least three contact assemblies extending parallel to one another with a housing accommodating the at least three contact assemblies by insert molding, wherein each contact assembly includes a base made of metal including a plurality of contact bases arranged in a longitudinal direction of the contact assembly and a coupling base coupling the plurality of contact bases with one another, and a plurality of conductive patterns formed in the plurality of contact bases with an insulating layer interposed therebetween, the at least three contact assemblies include a first contact assembly, at least one second contact assembly, and a third contact assembly in this recited order in a direction orthogonal to the longitudinal direction, and a sectional surface of the base of the at least one second contact assembly is observable when viewing the connector along the longitudinal direction.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A connector comprising:

at least one contact assembly; and a housing accommodating the at least one contact assembly, the at least one contact assembly and the housing being integrally formed by insert molding, wherein the at least one contact assembly includes a base made of metal including a plurality of contact bases arranged in a longitudinal direction of the contact assembly and a coupling base coupling the plurality of contact bases with one another, and a plurality of conductive patterns formed in the plurality of contact bases with an insulating layer interposed therebetween, and an end surface of the base of the at least one contact assembly is exposed from the housing when viewing the connector along the longitudinal direction.

2. The connector according to claim 1, wherein the base of the at least one contact assembly projects outward from a peripheral surface of the housing.

3. The connector according to claim 2, wherein the end surface of the base of the at least one contact assembly is located outside the peripheral surface of the housing.

4. The connector according to claim 1, wherein the plurality of contact bases are formed to project from the coupling base at least in a thickness direction of the coupling base.

5. The connector according to claim 4, wherein the plurality of contact bases are elastically deformable.

6. The connector according to claim 4, wherein the plurality of contact bases are not elastically deformable.

7. The connector according to claim 4, wherein the plurality of contact bases are disposed in two rows with the coupling base interposed therebetween.

8. The connector according to claim 7, wherein the plurality of contact bases belonging to one row and the plurality of contact bases belonging to the other row are respectively opposed to each other in a direction orthogonal to the longitudinal direction.

9. The connector according to claim 8, wherein two conductive patterns formed respectively in two contact bases opposed to each other in the direction orthogonal to the longitudinal direction are electrically connected to each other.

10. The connector according to claim 8, wherein two conductive patterns formed respectively in two contact bases opposed to each other in the direction orthogonal to the longitudinal direction are electrically independent of each other.

11. The connector according to claim 1, wherein the base includes at least one shrinkage prevention beam projecting from the coupling base in the direction orthogonal to the longitudinal direction and fixed to the housing.

12. The connector according to claim 11, wherein the at least one shrinkage prevention beam includes two shrinkage prevention beams projecting to recede from each other from the coupling base.

13. The connector according to claim 1, wherein each conductive pattern is covered with a resist except for a part in the contact base.

14. The connector according to claim 1, wherein the plurality of contact bases of one contact assembly and the plurality of contact bases of another contact assembly among two contact assemblies adjacent to each other are arranged in a staggered manner so that they are not opposed to each other in the direction orthogonal to the longitudinal direction.

15. The connector according to claim 1, wherein the at least one contact assembly includes at least three contact assemblies extending parallel to one another, the at least three contact assemblies include a first contact assembly, at least one second contact assembly, and a third contact assembly in this recited order in a direction orthogonal to the longitudinal direction, and an end surface of the base of the at least one second contact assembly is exposed from the housing when viewing the connector along the longitudinal direction.

* * * * *